US007438639B2

(12) United States Patent
Osawa

(10) Patent No.: US 7,438,639 B2
(45) Date of Patent: Oct. 21, 2008

(54) GAMING MACHINE WITH COLUMN LINKING FEATURE

(75) Inventor: Akira Osawa, Tokyo (JP)

(73) Assignee: Aruze Corp., Tokyo (JP)

( * ) Notice: Subject to any disclaimer, the term of this patent is extended or adjusted under 35 U.S.C. 154(b) by 658 days.

(21) Appl. No.: 11/043,036

(22) Filed: Jan. 27, 2005

(65) Prior Publication Data

US 2005/0170882 A1 Aug. 4, 2005

(30) Foreign Application Priority Data

Jan. 30, 2004 (JP) ............................ 2004-024526

(51) Int. Cl.
*A63F 13/00* (2006.01)

(52) U.S. Cl. ............................ 463/20; 463/21; 463/25; 463/30; 463/31

(58) Field of Classification Search ............ 463/20-21, 463/30-31, 25
See application file for complete search history.

(56) References Cited

U.S. PATENT DOCUMENTS 5,833,537 A * 11/1998 Barrie ........................ 463/21
5,997,401 A * 12/1999 Crawford .................... 463/20
6,159,095 A * 12/2000 Frohm et al. ................. 463/19
6,159,098 A 12/2000 Slomiany et al.
6,186,894 B1 * 2/2001 Mayeroff .................... 463/20
6,270,412 B1 * 8/2001 Crawford et al. ............. 463/20
6,375,570 B1 * 4/2002 Poole ......................... 463/31
6,419,579 B1 * 7/2002 Bennett ...................... 463/20
6,464,581 B1 * 10/2002 Yoseloff et al. .............. 463/20
6,506,114 B1 * 1/2003 Estes et al. .................... 463/16
6,517,433 B2 * 2/2003 Loose et al. ................. 463/20
6,579,178 B1 * 6/2003 Walker et al. ................ 463/20
6,685,560 B1 * 2/2004 Hughes ...................... 463/16
6,702,675 B2 * 3/2004 Poole et al. .................. 463/31
6,786,818 B1 * 9/2004 Rothschild et al. ........... 463/20
6,855,054 B2 * 2/2005 White et al. ................. 463/21
6,893,342 B1 * 5/2005 Singer et al. ................. 463/20
6,923,720 B2 * 8/2005 Loose ........................ 463/16
6,960,133 B1 * 11/2005 Marks et al. ................. 463/20
2002/0019254 A1 * 2/2002 Ainsworth ................... 463/16
2002/0045482 A1 * 4/2002 Poole ......................... 463/31
2003/0022712 A1 * 1/2003 Locke ........................ 463/20
2003/0027623 A1 * 2/2003 Rose .......................... 463/20
2003/0064802 A1 * 4/2003 Rodgers et al. .............. 463/30
2003/0087687 A1 * 5/2003 Locke et al. ................. 463/20
2003/0087690 A1 * 5/2003 Loose et al. ................. 463/20
2005/0054436 A1 * 3/2005 Frizzell et al. ............... 463/25
2005/0079907 A1 * 4/2005 Aida .......................... 463/20
2005/0170876 A1 * 8/2005 Masci et al. ................. 463/16
2005/0282620 A1 * 12/2005 Marks et al. ................. 463/20

(Continued)

FOREIGN PATENT DOCUMENTS

EP 0 945 837 A2 9/1999

(Continued)

*Primary Examiner*—Corbett Coburn
*Assistant Examiner*—William McCulloch
(74) *Attorney, Agent, or Firm*—Arent Fox LLP

(57) ABSTRACT

When stopping all of simulated reels results in magnet symbols belonging to two or more adjacent reels being in a form that the magnet symbols attract each other, the adjacent reels are linked to each other. After that, the reels are variably displayed and stopped with the link of the adjacent reels kept.

15 Claims, 11 Drawing Sheets

U.S. PATENT DOCUMENTS

2005/0288094 A1 * 12/2005 Marks et al. .................. 463/20
2006/0160604 A1 * 7/2006 Aida ........................... 463/20

FOREIGN PATENT DOCUMENTS

EP 1 205 894 A2 5/2002
JP 2001-276313 10/2001
JP 2002-28279 1/2002
JP 2002-78855 3/2002
JP 2003-180908 7/2003
WO 01/28647 A1 4/2001

* cited by examiner

GAMING MACHINE WITH COLUMN LINKING FEATURE

CROSS-REFERENCE TO THE RELATED APPLICATION(S)

This application is based upon and claims a priority from the prior Japanese Patent Application No. 2004-024526 filed on Jan. 30, 2004, the entire contents of which are incorporated herein by reference.

BACKGROUND OF THE INVENTION

1. Field of the Invention

The present invention relates to a gaming machine which is provided with a relatively large number of pay lines crossing each other in a complicated manner, and also to a control method thereof and a control program therefor.

2. Description of Related Art

In general, a slot machine which is one of a gaming machine includes, as an important component thereof, a symbol display means for variably displaying and stopping a plurality of symbols for each columns.

Such slot machines can be roughly divided, based on forms of the symbol display means, into two types: a type adopting a mechanical reel and a type adopting a simulated reel as the symbol display means. The mechanical reel type includes multiple reels having multiple kinds of symbol along the periphery, and the symbols can be variably displayed and stopped by mechanically rotating and stopping the reels. On the other hand, the simulated-reel type includes a display device for displaying multiple reel images, and the symbols can be variably displayed and stopped by spinning and stopping the reels on the display screen by electrically controlling the driving of the display device. Slot machines also can be roughly divided into two types of a 3-reel type and a 5-reel type based on the number of reels. The 5-reel type in particular is widely popular among players in foreign casinos since relatively many symbols are provided to a machine as a whole, which can enhance the variety of amusement of games. In other words, slot machines can be roughly divided into a 3-mechanical reel type, a 3-simulated reel type, a 5-mechanical reel type, and a 5-simulated reel type.

One disclosed in Japanese Patent No. 2505204 is a typical example of the 5-mechanical reel type.

According to the patent document, when scattered symbols are displayed on each of five mechanical reels but not aligned along an activated pay line (which may be called an "activated line"), it is assumed that a specific winning combination has been made, and as a result, a profit therefor is given to a player. To give an example, the specific winning combination is made in a case that when stopping the rotations of all reels results in a scattered symbol belonging to one of all the stopped reels being on an activated line. With this as a trigger, the four reels without the scattered symbols on the activated line are automatically rotated in a forward or reverse direction. As a result, scattered symbols align along the activated line. The patent document discloses that the technical idea is applicable to the simulated-reel type.

On the other hand, JP-A-2001-276313, JP-A-2002-28279, JP-A-2002-78855 and JP-A-2003-180908 disclose typical examples of the 5-simulated reel type. Machines disclosed in these patent documents are common in that profits can be given to players more often by providing a free game as a bonus in which players easily win when trigger symbols are aligned along an activated line and until a predetermined number of games are finished thereafter. Spinning of simulated reels is automatically stopped in a free game.

According to JP-A-2001-276313 and JP-A-2002-28279, in particular, a special symbol appears at at least one symbol position, when a secondary free game subsequent to a basic game (which may be called a "main game" depending on manufacturers) is finished. The special symbol is temporarily replaced by a symbol thereunder, which contributes to making a winning combination if applicable. JP-A-2002-28279, incidentally, discloses that some of the special symbols are replaced by puzzle symbols serving as pieces of a large picture.

According to JP-A-2002-78855, symbol positions are displayed on a display and at least one pay line associates with a matrix of the symbol positions. Each pay line is composed of the equal number of symbol positions to the number of columns in the matrix and does not cross all of columns.

According to JP-A-2003-180908, games are executed so that a specific symbol as a target symbol stopped at a winning position brings a win. In this case, reel images in which an unmasked area having a form agreeing with a contour form of the specific symbol is arranged at the winning position are displayed on a display device.

SUMMARY OF THE INVENTION

The biggest problem of a 5-reel type is such that a player, especially a beginner who is not familiar with the game, tends to have the impression that, in a main game, making a small win or a bonus combination which triggers starting a bonus game (which is a concept including a free game; hereinafter the same) seems to be hard.

According to the 5-reel type of JP-A-2505204, in particular, the specific winning combination by the scattered symbols has, differently from a normal wining combination, a form such that a player is hard to recognize the win. Therefore, profits are distributed when an occurrence condition of the specific winning combination is met and when the scattered symbols are aligned along the activated line so that players can be more interested in the specific win. However, when a player is a beginner, the player may miss a combination of symbols which indicates the specific winning combination, and cannot immediately understand why profits are distributed twice in one game and only aimlessly receives the distribution of the profits twice. Thus, the meaning of the presence of the specific win substantially lessens. Even when this technology is applied to a 5-simulated reel type, the same problem may occur.

A 5-simulated reel type has fewer mechanical limits than that of a 5-mechanical reel type and has a high degree of freedom in making rules for a game. This means that pay lines of a 5-rell type, the number of which is more than that of a 3-reel type, cross each other, which complicates its construction. Thus, players, especially beginners, cannot easily understand how symbols included in simulated reels should be combined to make a win.

According to JP-A-2001-276313 and JP-A-2002-28279, in particular, performed is a series of symbol processings which includes arbitrarily selecting one of symbol positions, making the special symbol appear at the selected position, and temporarily replacing a symbol thereunder by the special symbol, and, if matched as a result, making a winning combination, every time one game is finished during a free game. The series of symbol prosessings is performed on a display. However, the image of symbols variably displayed is significantly different from conventional images, and therefore players, especially beginners, may be confused. Furthermore, this technology has complicated image processing for variably displaying and stopping the symbols. In the technology according to JP-A-2002-28279, some of the special symbols are replaced by puzzle symbols, which requires a player to take a time for solving the puzzle and may hinder the smooth and fast advancement of the game.

According to JP-A-2002-78855, pay lines are not uniform and have various shapes such as a T-shape, a shape of a cross, and a check mark shape. Thus, pay lines, the number of which reaches several tens, cross each other, which extremely complicates its construction. As a result, the problems common in a 5-rell type and in a 5 simulated-reel type described above significantly occur in this case.

Moreover, according to JP-A-2003-180908, when a spin motion condition of simulated reels is met, a synthesized image composed of a mask image and a reel image is displayed on a display device. Here, the mask image has a masked area and an unmasked area whose border is agree with a contour form of a specific symbol as a target symbol. Thus, a player can easily recognize that a win is made when the target symbol is stopped at a winning position. However, the image processing for symbols in this case is complicated similarly to JP-A-2001-276313 and JP-A-2002-28279 described above.

It is a first object of the invention to provide a gaming machine, a control method thereof, and a control program therefor, which give a gaming characteristic that a free game provided as a bonus with respect to a main game cannot provide so that players including beginners can easily understand rules of a game and beginners can be given an incentive to challenge the game.

It is a second object of the invention to provide a gaming machine, a control method thereof, and a control program therefor, which can suppress complicated control over variably displaying and stopping symbols for adding the above-mentioned new gaming characteristic.

In order to achieve the objects, the inventors came up with an idea that, when a specific condition is met, multiple columns meeting the specific condition are linked and the symbols are variably displayed and stopped with the link of the columns kept. The specific aspects of the invention based on the idea are as follows.

According to a first aspect of the invention, there is provided a gaming machine comprising: a symbol display unit for variably displaying and stopping a plurality of symbols for each columns; a profit giving unit for, when stopping symbols belonging to all columns by the symbol display unit results in a winning combination of symbols, giving a profit in accordance with the winning combination to a player; a column linking unit for, when stopping symbols belonging to all columns by the symbol display unit results in a specific kind of symbols belonging to columns adjacent to each other being in a specific state, linking the adjacent columns, or for, when stopping symbols belonging to all columns by the symbol display unit results in a specific kind of symbols belonging to each of the columns on the both sides of one or more columns being in a specific state, linking the columns on the both sides and columns therebetween; and a symbol display control unit for controlling the symbol display unit such that the symbols can be variably displayed and stopped with the link kept after the columns are linked by the column linking unit.

According to a second aspect of the invention, there is provided a method for controlling a gaming machine having a symbol display unit for variably displaying and stopping a plurality of symbols for each columns, in which, when stopping symbols belonging to all columns by the symbol display unit results in a winning combination of symbols, a profit in accordance with the winning combination is given to a player. The method includes the steps of: linking columns adjacent to each other when stopping symbols belonging to all columns by the symbol display unit results in a specific kind of symbols belonging to the adjacent columns being in a specific state, or linking columns on the both sides of one or more columns and the one or more columns therebetween when stopping symbols belonging to all columns by the symbol display unit results in a specific kind of symbols belonging to each of the columns on the both sides of the one or more columns being in a specific state; and controlling the symbol display unit such that the symbols can be variably displayed and stopped with the link kept after the columns are linked by the column linking step.

According to a third aspect of the invention, there is provided a computer program for controlling a gaming machine having a symbol display unit for variably displaying and stopping a plurality of symbols for each columns, in which, when stopping symbols belonging to all columns by the symbol display unit results in a winning combination of symbols, a profit in accordance with the winning combination is given to a player. The program causes a computer to perform the steps of: linking columns adjacent to each other when stopping symbols belonging to all columns by the symbol display unit results in a specific kind of symbols belonging to the adjacent columns being in a specific state, or linking columns on the both sides of one or more columns and the one or more columns therebetween when stopping symbols belonging to all columns by the symbol display unit results in a specific kind of symbols belonging to each of the columns on the both sides of the one or more columns being in a specific state; and controlling the symbol display unit such that the symbols can be variably displayed and stopped with the link kept after the columns are linked by the column linking step.

Here, the expression, "a specific kind of symbols . . . being in a specific state" includes a concept that a specific kind of symbols are stopped in a form expressing a natural-scientific link (including a physical link and a chemical link) such as a form that the N-poles and S-poles of magnets attract each other and a concept that a specific kind of symbols are stopped in a form expressing human interactions like shaking hands and kissing.

According to the invention, after columns are linked to each other, the symbols are variably displayed and stopped with the link kept. As a result, when small-winning symbols belonging to each of the linked columns are aligned along an activated line, symbols are variably displayed and stopped such that a li-zhi state for a small win can be maintained. Hereby, when the small-winning symbol belonging to a column adjacent to one of the linked columns is stopped at an activated position for making a small win, the small win is made. On the other hand, when trigger symbols belonging to each of the linked columns are aligned along an activated line, symbols are variably displayed and stopped such that a li-zhi state for a win of a bonus combination can be maintained. Hereby, when the trigger symbol belonging to a column adjacent to one of the linked columns is stopped at an activated position for making a win of the bonus combination, a bonus game is started. Therefore, ali-zhi state for a small win or making a bonus combination which triggers starting a bonus game or the like can be continuously made intensively. Here, the "li-zhi state" indicates a state where a wining combination will be made if one corresponding symbol belonging to a column adjacent to one of the linked columns is stopped at an activated position for making the winning combination.

Since a gaming characteristic that a free game provided as a bonus with respect to a main game cannot provide is given, players including beginners can easily understand rules of a game. As a result, beginners can be given an incentive to challenge the game.

The control over variably displaying and stopping symbols for giving the gaming characteristic includes variably displaying and stopping symbols with the link of multiple columns kept, which is easier. Therefore, the complication of the control can be suppressed.

Especially, since the processing keeping the link of columns is performed when a specific kind of symbols are stopped in a form expressing a natural-scientific link or a human-interaction, players including beginners can immediately perceive that a game is expanded in a new form as described above thereafter and can immediately understand rules fitting to new game details. As a result, the smooth and fast advancement of the game can be obtained.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Preferred embodiments of the invention will be described below with reference to drawings.

Figure 1:
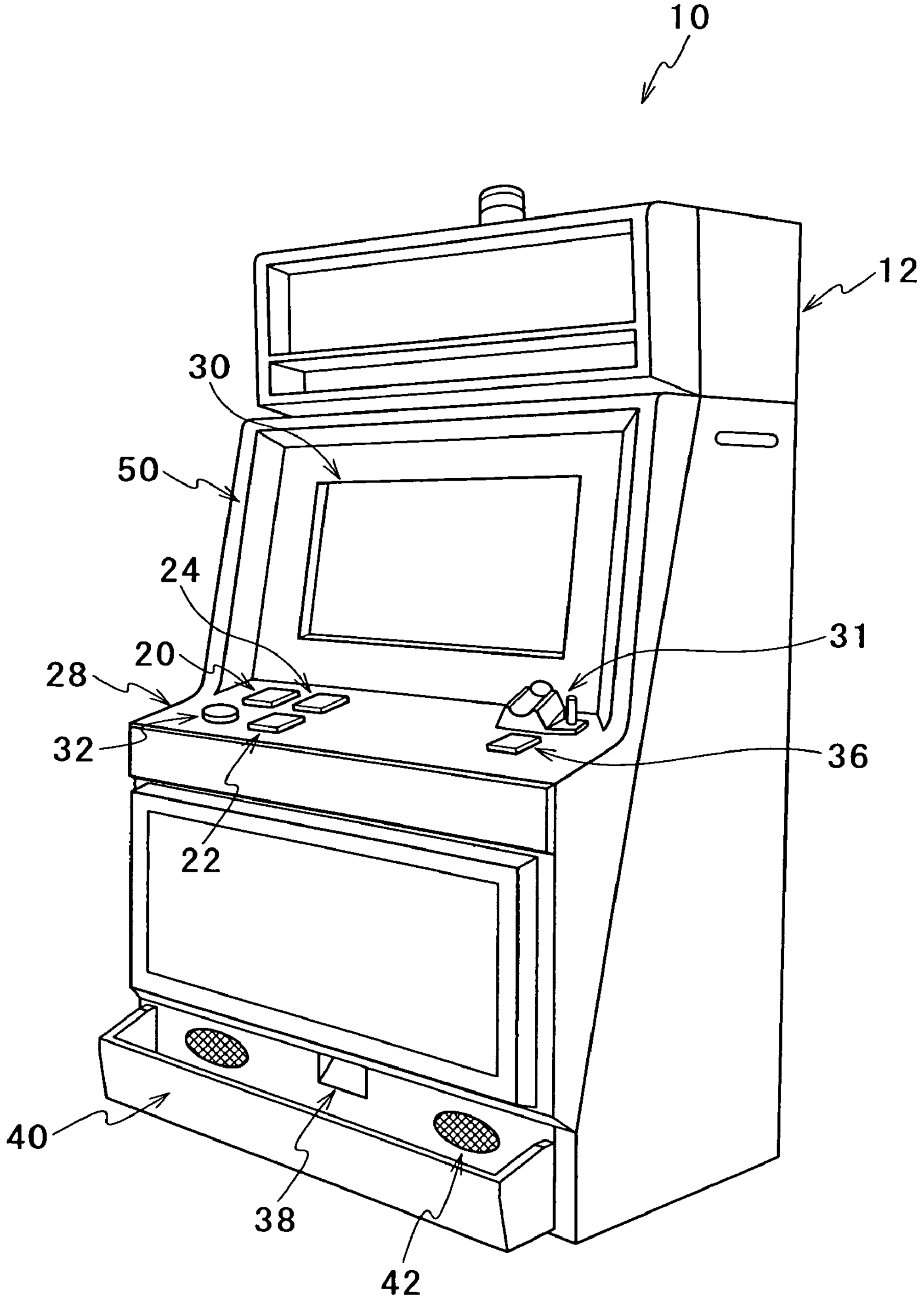
FIG. 1 is a perspective view showing an appearance of a slot machine as a gaming machine according to an embodiment of the invention.

First of all, a construction of an appearance of a slot machine as a gaming machine according to an embodiment of the invention will be described with reference to FIG. 1. A slot machine 10 in this embodiment is a 5-simulated reel slot machine and includes a cabinet 12 and a main door 50.

The cabinet 12 is open on a side facing a player and is placed, for example, in a given place in a casino. The cabinet 12 contains various components including a control device 100 (see FIG. 2) for electrically controlling the slot machine 10 and a hopper 58 (see FIG. 2) for controlling insertion, saving and payout of coins.

The main door 50 is a member for covering the internal part of the cabinet 12 not to expose to the outside. The main door 50 is supported rotatably by means of a shaft to the left side of the front of the cabinet 12. The door 50 is rotated toward the front and back about the shaft so that the open state and closed state can be switched. A display device 30 is provided at a substantial center of the main door 50.

The display device 30 is a unit for displaying various images relating to a game including five reel images, effect images, informing images, and the like. A player advances a game by visually checking various images displayed on the display device 30. Applied here as the display device 30 is a video display, which may be any one of CRT, dot matrix, LED, LCD, and EL types. The type of the video display is not limited thereto, but a video display of any conventionally publicly known and general type can be adopted. The display device 30 may include multiple video displays of one or multiple types.

A substantially horizontal control panel 28 is provided below the display device 30. A coin insertion slot 31 is provided on the right side of the control panel 28 for inserting a coin into the slot machine 10. On the other hand, (1): a LINE switch 20, (2): a BET switch 22 and (3): a spin-repeat bet switch 24 are provided on the left side of the control panel 28. The LINE switch 20 is used for activating a pay line to be bet for a game. The BET switch 22 is used for selecting the number of coins to be bet for a pay line activated by the LINE switch 20. The spin repeat bet switch 24 is used for performing a game again without changing the number of coins bet for a pay line activated in the previous game. These LINE switch 20 and BET switch 22 or the spin repeat bet switch 24 are pressed so that a pay line activated in accordance with the operation and the number of coins bet for the line can be determined.

The control panel 28 includes a start switch 32 on the left side of the BET switch 22. Pressing one of the start switch 32 and the spin repeat bet switch 24 triggers starting a game, and the spin motion of five reel images displayed on the display device 30 is started in a predetermined form.

The control panel 28 further includes a payout switch 36 near the coin insertion slot 31. Once a player presses the payout switch 36, an inserted coin is paid out from a payout opening 38 opening at the front lower part of the door 50, and the paid coin is stored in a coin receiver 40. Speaker grilles 42 are provided above the coin receiver 40 and on left and right sides of the coin payout opening 38. The speaker grilles 42 transmit an effect sound emitted from a speaker 46 (see FIG. 2) accommodated within the cabinet 12 to the outside of the cabinet 12.

Figure 2:
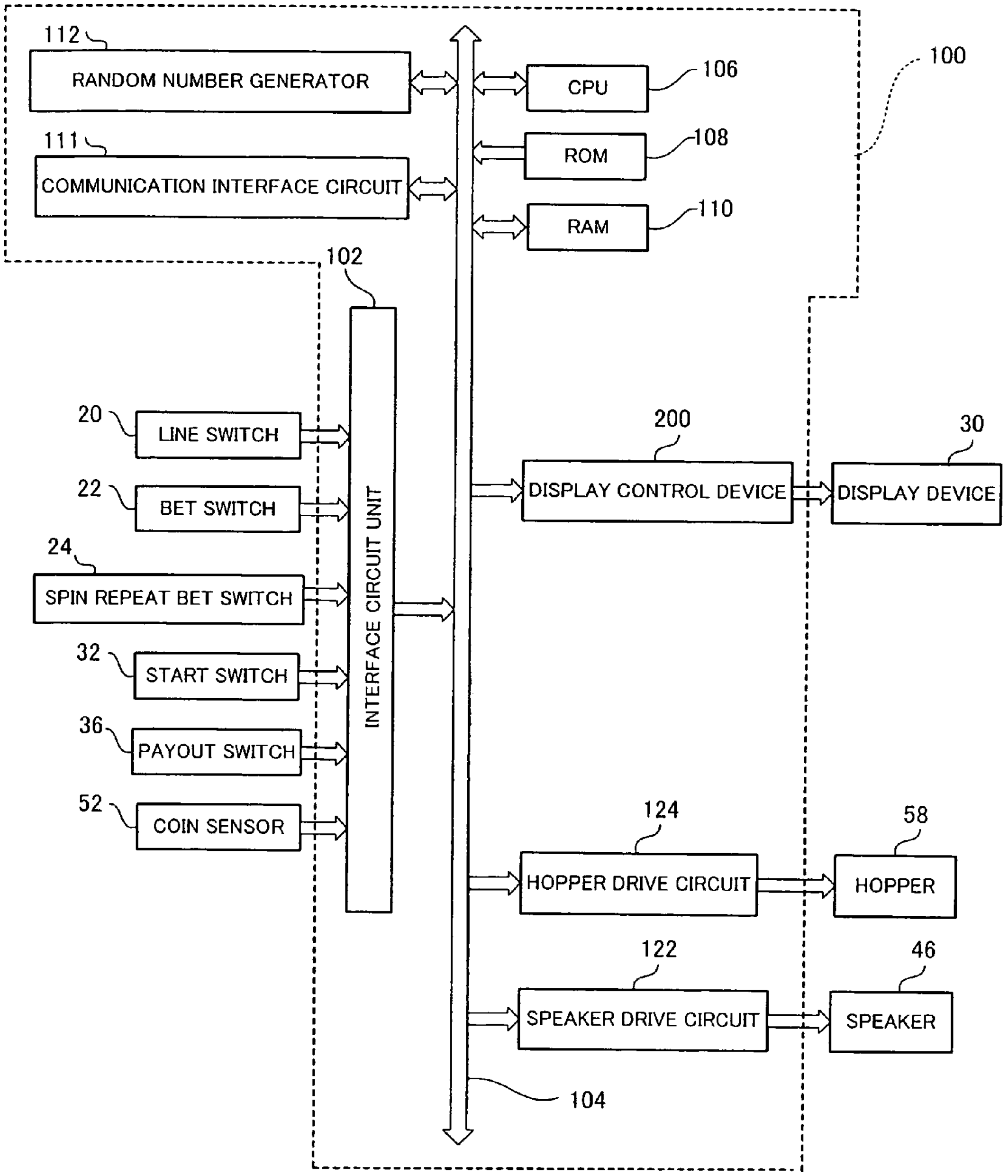
FIG. 2 is a block diagram showing an electrical construction of a control device of the slot machine.

Next, an electrical construction of the control device 100 of the slot machine will be described with reference to FIG. 2.

The control device 100 is a microcomputer and includes an interface circuit unit 102, an input/output bus 104, a CPU 106, a ROM 108, a RAM 110, a communication interface circuit 111, a random number generator 112, a speaker drive circuit 122, a hopper drive circuit 124, and a display control device 200.

The start switch 32 is connected to the interface circuit unit 102, which is connected to the input/output bus 104. A start signal output from the start switch 32 is converted to a predetermined signal by the interface circuit unit 102 and then is supplied to the input/output bus 104. The input/output bus 104 inputs/outputs data signals or address signals to/from the CPU 106.

The LINE switch 20, BET switch 22, spin repeat bet switch 24, and payout switch 36 are also connected to the interface circuit unit 102. Switching signals output from these switches 20, 22 and 24 are also supplied to the interface circuit unit 102, converted to predetermined signals by the circuit unit 102, and then supplied to the input/output bus 104.

Further, a coin sensor 52 is connected to the interface circuit unit 102. A sensing signal output from the sensor 52 is also supplied to the interface circuit unit 102, converted to a predetermined signal by the circuit unit 102, and then supplied to the input/output bus 104.

The ROM 108 and RAM 110 are also connected to the input/output bus 104. The ROM 108 stores a control program for centrally controlling the slot machine 10, a program for executing routines shown in FIGS. 7, 8 and 9, initial data for executing the control program, a data table to be used for an internal lottery, probability lottery tables, stop tables, symbol arrangement tables, a winning form table, and the like.

Figure 10A:
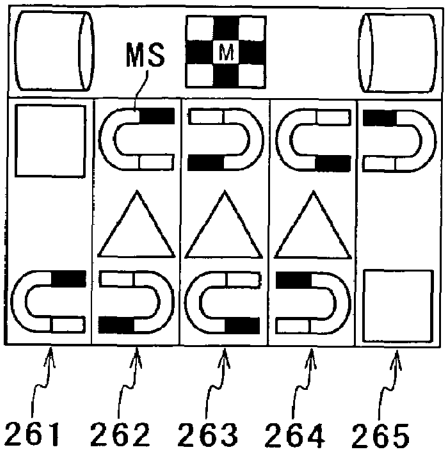
FIG. 10A is a diagram showing a linking pattern of simulated reels.
Figure 10B:
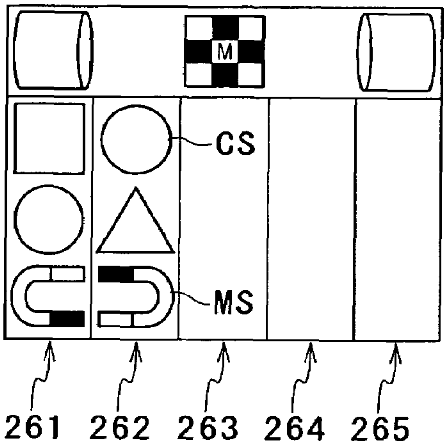
FIG. 10B is a diagram showing a case that first and second reels are linked and circle symbols serving as small-winning symbols belonging to both of the reels are aligned along an activated line.
Figure 10C:
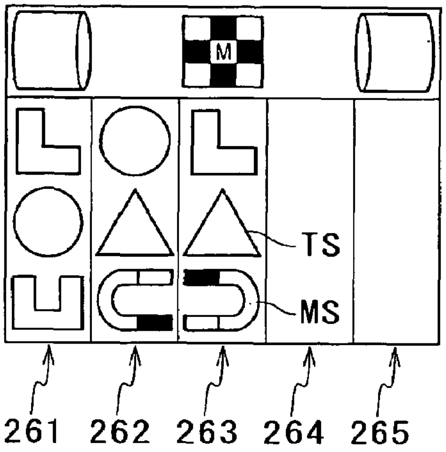
FIG. 10C is a diagram showing a case that second and third reels are linked and triangle symbols serving as trigger symbols belonging to both of the reels are aligned along an activated line.

Especially, as shown in FIGS. 10A, 10B and 10C, the routine executable program includes a step (1) of linking reels adjacent to each other when stopping all of simulated reels 261, 262, 263, 264 and 265 results in magnet symbols MS serving as specific symbols belonging to the adjacent reels being in a form that the N-poles and S-poles attract each other, and a step (2) of controlling the display device 30 such that reel symbol images can be variably displayed and stopped with the adjacent reels linked at all times after the adjacent reels are linked until a predetermined number of games are finished. These steps (1) and (2) are performed by the control device 100 serving as a microcomputer. The predetermined number of games can be arbitrarily defined.

As shown in FIG. 10A, two or more reels may be linked in accordance with a state of the stopped reels 261 to 265, and various linking patterns are available.

The step (2) includes a step of controlling the display device 30 such that a first state where one kind of symbols belonging to each of the linked reels are aligned along an activated line can be achieved and thereafter the symbols can be variably displayed and stopped with the first state kept. Here, the first state indicates a state where a wining combination relating to the one kind of symbol will be made if the one kind of symbol belonging to a reel adjacent to one of the linked reels is stopped at an activated position for making the winning combination. To give an example, as shown in FIG. 10B, the display device 30 is controlled such that a state (which corresponds to the first state and may be referred to as a "li-zhi state for a small win") where circle symbols CS serving as small-winning symbols belonging to a first reel 261 and a second reel 262, which are adjacent to each other and linked by the magnet symbols MS, are aligned along an activated line can be achieved and thereafter the symbols can be variably displayed and stopped with the li-zhi state for a small win kept until the predetermined number of games are finished. Accordingly, a small win is always made when the circle symbol CS belonging to a third reel 263 adjacent to the second reel 262 of the linked reels 261 and 262 is stopped at an activated position for making the small win. Notably, these steps are also performed by the control device 100.

The step (2) further includes a step of controlling the display device 30 such that a second state where trigger symbols belonging to each of the reels are aligned along an activated line can be achieved and thereafter the symbols can be variably displayed and stopped with the second state kept. Here, the second state indicates a state where a bonus game will be started if the trigger symbol belonging to a reel adjacent to one of the linked reels is stopped at an activated position for making a win of a bonus combination. To give an example, as shown in FIG. 10C, the display device 30 is controlled such that a state (which corresponds to the second state and may be referred to as a "li-zhi state for starting a bonus game") where triangle symbols TS serving as the trigger symbols belonging to the second reel 262 and a third reel 263, which are adjacent to each other and linked by the magnet symbols MS, are aligned along an activated line can be achieved and thereafter the symbols can be variably displayed and stopped with the li-zhi state for starting a bonus game kept until the predetermined number of games are finished. Accordingly, the bonus game is always started when the triangle symbol TS belonging to a fourth reel 264 adjacent to the third reel 263 linking to the second reel 262 is stopped at an activated position for making the bonus combination. Notably, these steps are also performed by the control device 100.

Referring back to FIG. 2, the RAM 110 temporarily stores flag, variable values, or the like to be used in the control program.

The input/output bus 104 is also connected to the communication interface circuit 111, which is a circuit for communicating with a server and the like via various kinds of communication network such as a public switched telephone network and a LAN.

The input/output bus 104 is also connected to the random number generator 112 for generating random numbers in a certain range, e.g., "0" to "65535 (16th power of 2)".

The speaker drive circuit 122 for driving the speaker 46 is also connected to the input/output bus 104. The CPU 106 loads sound data stored in the ROM 108 and send the loaded sound data to the speaker drive circuit 122 through the input/output bus 104. Thus, a predetermined effect sound is generated from the speaker 46.

Still further, the hopper drive circuit 124 for driving the hopper 58 is also connected to the input/output bus 104. When a payout signal is input through the payout switch 36, the CPU 106 outputs a drive signal to the hopper drive circuit 124 through the input/output bus 104. Thus, the hopper 58 pays out a coin corresponding to a remaining number of credits at that time, which is stored at a predetermined position of the RAM 110.

Additionally, the display control device 200 is also connected to the input/output bus 104. Based on switching signals output from the LINE switch 20, BET switch 22, and spin repeat bet switch 24 and on a sensing signal output from the coin sensor 52, the CPU 106 creates an image display command in accordance with a state and result of a game and outputs the created image display command through the input/output bus 104. When an image display command is input from the CPU 106, the display control device 200 generates a drive signal for driving the display device 30 based on the input image display command and outputs the generated drive signal to the display device 30. Thus, a predetermined image is displayed on the display screen of the display device 30.

Figure 3:
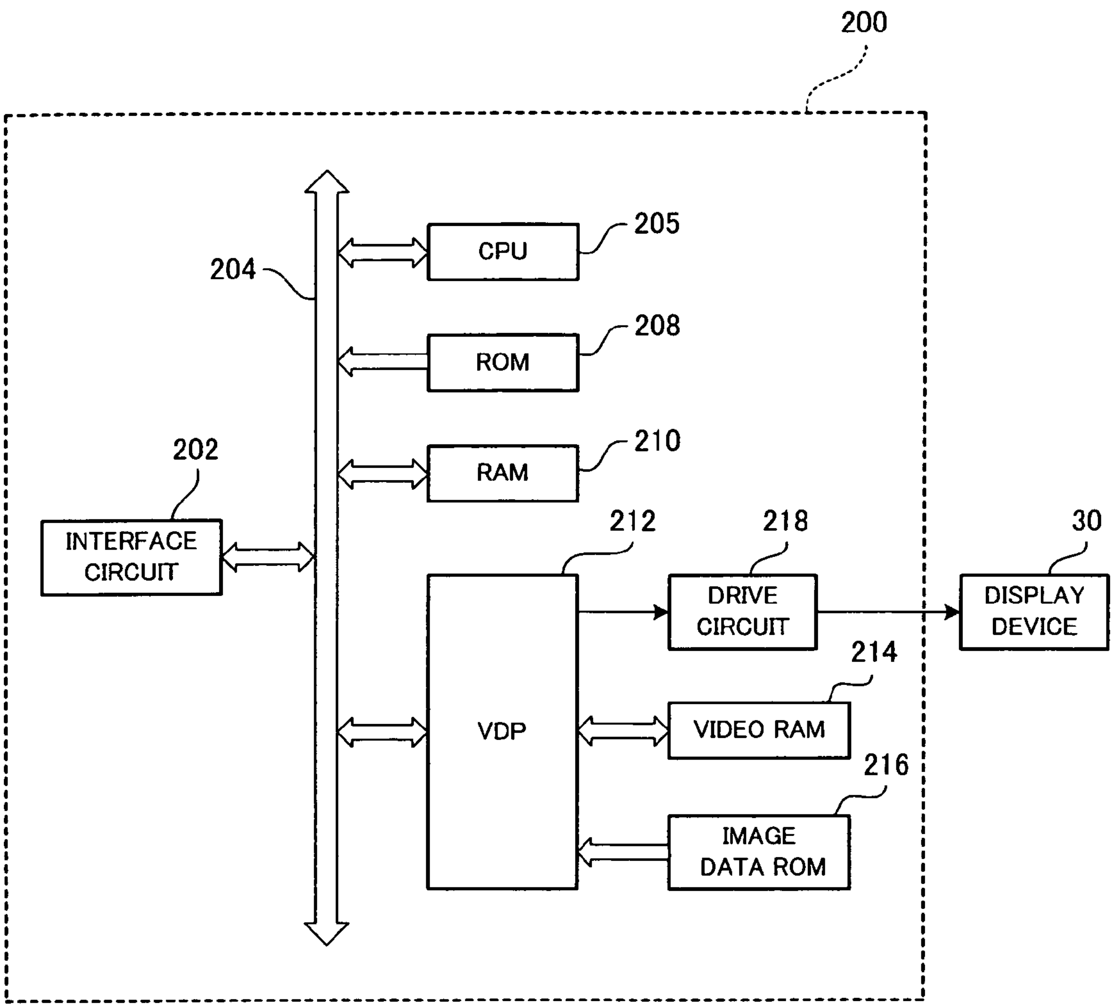
FIG. 3 is a block diagram showing an electrical construction of a display control device of the slot machine.

Next, an electrical construction of the display control device will be described with reference to FIG. 3.

The display control device 200 is a microcomputer for performing image display processing and includes an interface circuit 202, an input/output bus 204, a CPU 206, a ROM 208, a RAM 210, a VDP 212, a video RAM 214, an image data ROM 216 and a drive circuit 218.

The interface circuit 202 is connected to the input/output bus 204. An image display command output from the CPU 106 of the control device 100 is supplied to the input/output bus 204 through the interface circuit 202. The input/output bus 204 inputs/outputs data signals or address signals from/to the CPU 206.

The ROM 208 and RAM 210 are also connected to the input/output bus 204. The ROM 208 stores a display control program for generating a drive signal to be supplied to the display device 30 based on an image display command from the CPU 106 of the control device 100. The display control program is in particular made so as to reflect details of the routine executable program. The RAM 210 stores flag and/or variable values used in the display control program.

The VDP 212 is also connected to the input/output bus 204. The VDP 212 is a processor including a so-called split circuit, a screen circuit, a palette circuit, and the like and can perform different kinds of processing for displaying an image on the display device 30. The video RAM 214 and the image data ROM 216 are connected to the VDP 212. The video RAM 214 stores image data in accordance with an image display command from the CPU 106 of the control device 100. The image data ROM 216 stores various image data including image data of a reel and a reel symbol. The VDP 212 is also connected to the drive circuit 218 that outputs a drive signal for driving the display device 30.

The CPU 206 loads and executes the display control program stored in the ROM 208 so that image data to be displayed on the display device 30 can be stored in the video RAM 214 in accordance with an image display command from the CPU 106 of the control device 100. The image display command includes various image display commands such as commands for displaying reel images, for displaying reel symbol images, and for displaying character images.

The image data ROM 216 stores various image data including data of reel images, reel symbol images, character images, as described above, and a background image for forming the background of the display device 30. Especially, the reel symbol image data is data to be used for variably displaying and stopping symbols on the display device 30 and includes image data in accordance with various display forms, e.g., enlarged image, reduced image, and deformed image.

Figure 4:
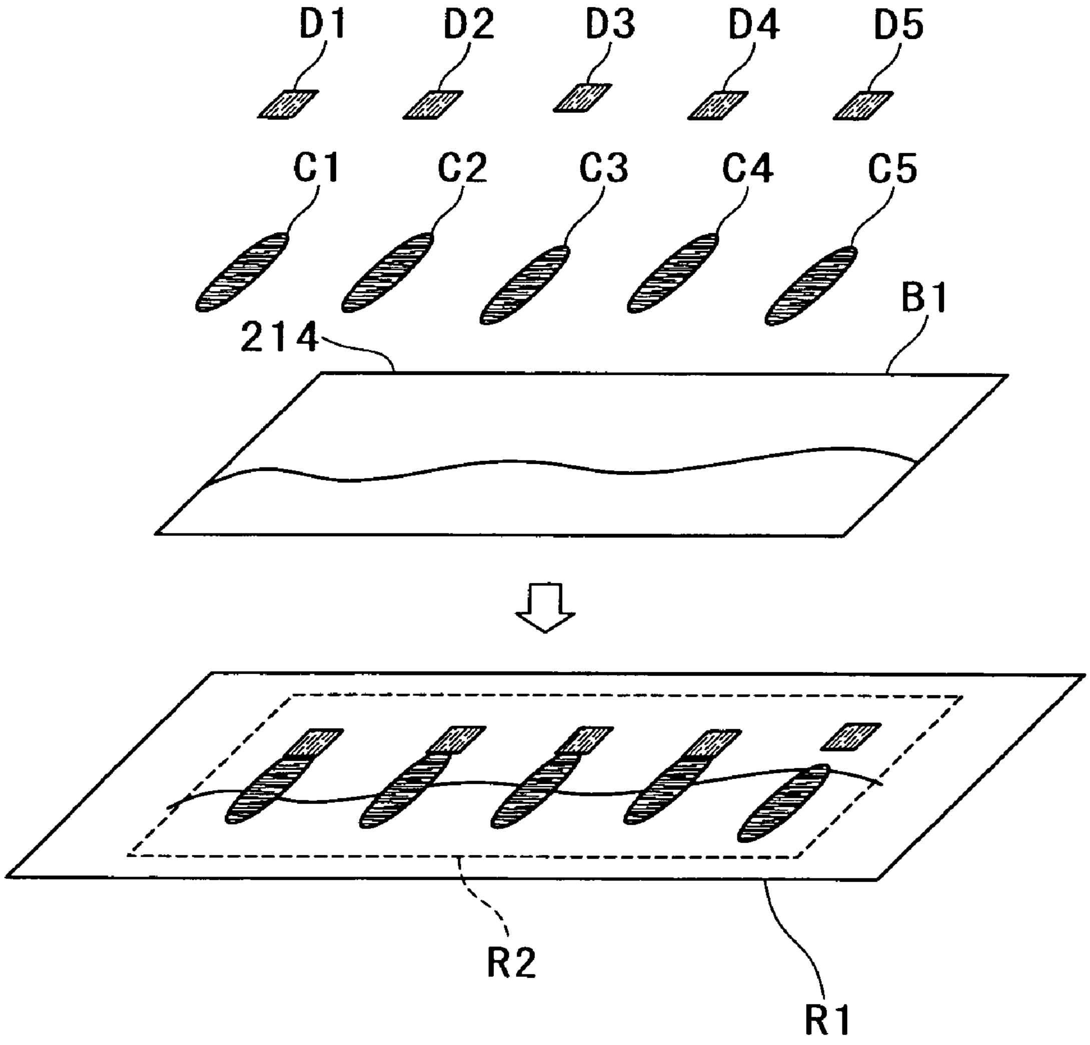
FIG. 4 is a diagram for illustrating an image display principle of the slot machine.

Next, an image display principle will be described with reference to FIG. 4.

The area (called a "screen image area" hereinafter) R1 of image data created by the video RAM 214 in accordance with an image display command is defined to be larger than a display area R2 displayed on the display device 30. In FIG. 4, the screen image area R1 is enclosed by a solid line, and the other display area R2 is enclosed by a dashed line. The size of the screen image area R1 is defined as described above so that reel images displayed on the display screen of the display device 30 can be smoothly scrolled.

When a symbol display command is input from the CPU 106 of the control device 100, the VDP 212 loads different symbol image data D1, D2, D3, D4 and D5 included in the reels 261 to 265, respectively, from the image data ROM 216 and then stores the loaded symbol image data D1 to D5 in predetermined memory areas of the video RAM 214, which correspond to positions to be displayed on the display screen of the display device 30.

When a character display command is output from the CPU 106 of the control device 100, the VDP 212 loads different character image data C1, C2, C3, C4 and C5 from the image data ROM 216 and then stores the loaded character image data C1 to C5 in predetermined memory areas of the video RAM 214, which correspond to positions to be displayed on the display screen of the display device 30.

Furthermore, when a background display command is output from the CPU 106 of the control device 100, the VDP 212 loads background image data B1 from the image data ROM 216 and then stores the loaded background image data B1 in a predetermined memory area of the video RAM 214, which corresponds to a position to be displayed on the display screen of the display device 30.

The VDP 212 creates image data in the video RAM 214 and then loads only the image data stored in the display area R2 from the video RAM 214 and supplies this to the drive circuit 218 as display signals.

Image data stored in the above mentioned predetermined memory area of the video RAM 214 are sequentially rewritten so that symbols belonging to the five simulated reels 261 to 265 can be displayed on the display screen of the display device 30 as if symbols on mechanical reels were varied by spin motion.

Apparently from the description above, in this embodiment, the claimed column linking unit and symbol display control unit are a concept including the ROM 108 storing a routine executable program including the reel linking step and reel display controlling step, the CPU 106 performing various kinds of control in accordance with the program stored in the ROM 108, the RAM 110 functioning as a working area of the CPU 106, and the display control device 200 performing image control in accordance with a control command from the CPU 106. Thus, the column linking unit and the symbol display control unit further include, when interpreted in a narrow sense, the CPU 206, ROM 208, RAM 210, VDP 212, video RAM 214, image data ROM 216, and drive circuit 218 for driving the display device 30, which are components of the display control device 200. This will be more apparent from a flow of a processing of the slot machine 10, which will be described later with reference to FIGS. 7 and 8.

Next, a pay line will be described. As described above, various image data are stored in the video RAM 214 so that various images can be displayed on the display screen of the display device 30 and a game can be advanced thereby.

Figure 5:
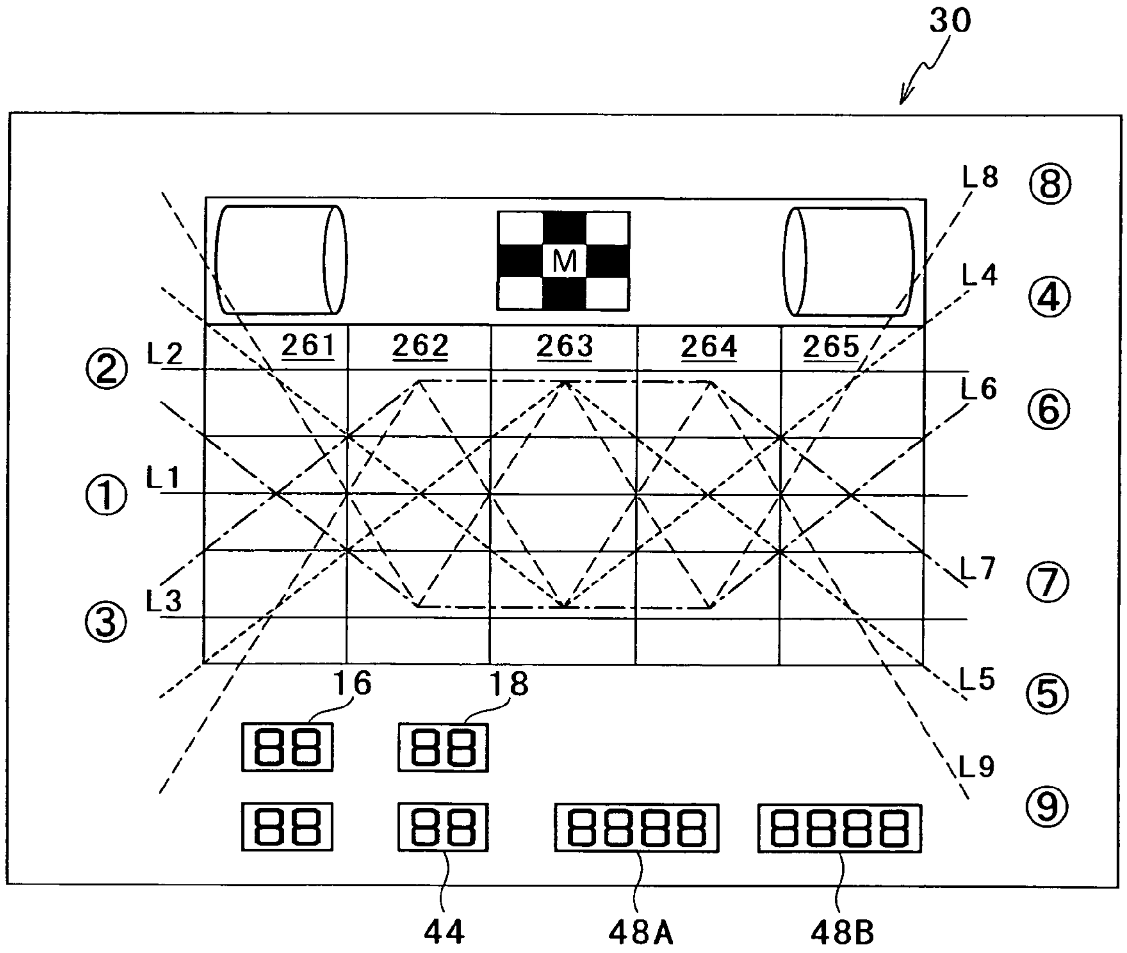
FIG. 5 is an enlarged diagram of a symbol display area showing a construction of pay lines of the slot machine.

Referring to FIG. 5, the five reels 261 to 265 are displayed on the display screen of the display device 30. Each of the reels 261 to 265 has a three-symbols display area for vertically displaying three symbols when stopped. Thus, when all of the five reels 261 to 265 are stopped, a total of fifteen symbols of three symbols vertically and five columns horizontally are arranged regularly to be visually checked by a player. On the assumption that symbols are regularly aligned as described above, a pay line of the slot machine 10 will be described.

The slot machine 10 has nine pay lines L1, L2, L3, L4, L5, L6, L7, L8 and L9. Each of the pay lines L1 to L9 extends through each one of the symbols on the reels 261 to 265.

More specifically, a first pay line L1 extends horizontally straight through symbols in the middle row of the reels 261 to 265. A second pay line L2 extends horizontally straight through symbols in the upper row of the reels 261 to 265. A third pay line L3 extends horizontally straight through symbols in the lower row of the reels 261 to 265. A fourth pay line L4 extends through and links a symbol in the upper row of the first reel 261, a symbol in the middle row of the second reel 262, a symbol in the lower row of the third reel 263, a symbol in the middle row of the fourth reel 264, and a symbol in the upper row of the fifth reel 265. A fifth pay line L5 is a vertically inverted line of the fourth pay line L4 and extends through and links a symbol in the lower row of the first reel 261, a symbol in the middle row of the second reel 262, a symbol in the upper row of the third reel 263, a symbol in the middle row of the fourth reel 264, and a symbol in the lower row of the fifth reel 265. A sixth pay line L6 extends through and links a symbol in the middle row of the first reel 261, symbols in the lower row of the second reel 262 to the fourth reel 264, and a symbol in the middle row of the fifth reel 265. A seventh pay line L7 is a vertically inverted line of the sixth pay line L6 and extends through and links a symbol in the middle row of the first reel 261, symbols in the upper row of the second reel 262 to fourth reel 264, and a symbol in the middle row of the fifth reel 265. An eighth pay line L8 extends through and links in a triangular form a symbol in the upper row of the first reel 261, a symbol in the lower row of the second reel 262, a symbol in the upper row of the third reel 263, a symbol in the lower row of the fourth reel 264, and a symbol in the upper row of the fifth reel 265. A ninth pay line L9 is a vertically inverted line of the eighth pay line L8 and extends through and links in a triangular form a symbol in the lower row of the first reel 261, a symbol in the upper row of the second reel 262, a symbol in the lower row of the third reel 263, a symbol in the upper row of the fourth reel 264, and a symbol in the lower row of the fifth reel 265.

A game result is derived from a combination of symbols aligned on the nine pay lines L1 to L9 defined as described above.

Each of the pay lines L1 to L9 is activated in response to an operation on the LINE switch 20 and BET switch 22 before variably displaying the symbols. The activated pay line is displayed on the display screen of the display device 30 in order for a player to recognize whether a winning combination has been made or not when a coin is bet or when the symbols are displayed as a predetermined combination on the activated pay line.

A number is given near each of the pay lines L1 to L9. The number "1" given to the first pay line L1 indicates a fact that the pay line L1 is activated when the LINE switch 20 is pressed once. Similarly, the number "2" given to the second pay line L2 indicates a fact that the pay line L2 is activated when the LINE switch 20 is pressed twice. The number "3" given to the third pay line L3 indicates a fact that the pay line L3 is activated when the LINE switch 20 is pressed three times. The number "4" given to the fourth pay line L4 indicates a fact that the pay line L4 is activated when the LINE switch 20 is pressed four times. The number "5" given to the fifth pay line L5 indicates a fact that the pay line L5 is activated when the LINE switch 20 is pressed five times. The number "6" given to the sixth pay line L6 indicates a fact that the pay line L6 is activated when the LINE switch 20 is pressed six times. The number "7" given to the seventh pay line L7 indicates a fact that the pay line L7 is activated when the LINE switch 20 is pressed seven times. The number "8" given to the eighth pay line L8 indicates a fact that the pay line L8 is activated when the LINE switch 20 is pressed eight times. The number "9" given to the ninth pay line L9 indicates a fact that the pay line L9 is activated when the LINE switch 20 is pressed nine times.

A game is not performed on the condition that all of the pay lines L1 to L9 are always valid, but, as described above, the activated pay lines depend on a selection by a player, and the number of coins required for the game depends on the selection result. In the slot machine 10, for example, in order to activate the first pay line L1, one coin is required at the minimum. In order to activate the second pay line L2 in addition to the pay line L1, two coins are required at the minimum. Furthermore, when activating the third pay line L3 to ninth pay line L9 in addition to the pay lines L1 and L2 is selected, nine coins are required at the minimum.

Here, the expression "at the minimum" is based on the fact that the number of coins multiple times the minimum can be bet on pay lines selected as described above. For example, when a total of nine coins are bet, the number of coins nine times the minimum (one) may be bet for the first pay line L1 only, the number of coins three times the minimum (one) for the first pay line L1 to the third pay line 3, or the minimum number (one) of coins for all of the pay lines L1 to L9. This means that a game can be performed under any betting condition in the range from a lower limit to an upper limit.

When the number of pay lines to be activated or the combination of the numbers of bet coins increases, betting condition by a player in each game may not be recognized easily. In order to solve the problem, an activated line counter 16 and a BET counter 18 are image-displayed in the lower part of the display screen of the display device 30.

The activated line counter 16 increments a count to be indicated by one every time a player presses the LINE switch 20. When the count of the activated line counter 16 is "1", the first pay line L1 having the number, "1", is only activated. When the count of the activated line counter 16 is "2", the first pay line L1 and second pay line L2 having the numbers, "1" and "2", respectively, are activated. When the count of the activated line counter 16 is "3", the first pay line L1 to third pay line L3 having the numbers, "1", "2" and "3", respectively, are activated. In other words, the count of the activated line counter 16 must indicate "9" at least in order to activate all of the pay lines L1 to L9. On the other hand, the BET counter 18 increments a count to be indicated by one every time a player presses the BET switch 22. The count "1" of the BET counter 18 indicates a fact that one coin is bet for each of the activated lines. In other words, every time the count of the BET counter 18 increments, the number of coins to be bet for each of the activated lines increases. Therefore, the number of coins used in one game is a product of the value on the activated line counter 16 and the value on the BET counter 18. The value of the product is displayed on a total-number-of-bets counter 44. The total-number-of-bets counter 44 is image-displayed immediately under the BET counter 18 in the lower part of the display screen of the display device 30.

In the slot machine 10, a winning combination is made when at least three predetermined symbols are aligned in series along a pay line activated as described above.

FIG. 5 includes a win counter 48A and a credit counter 48B. The counters 48A and 48B are image-displayed in order on the left side of the total-number-of-bets counter 44 in the lower part of the display screen of the display device 30.

Figure 6:
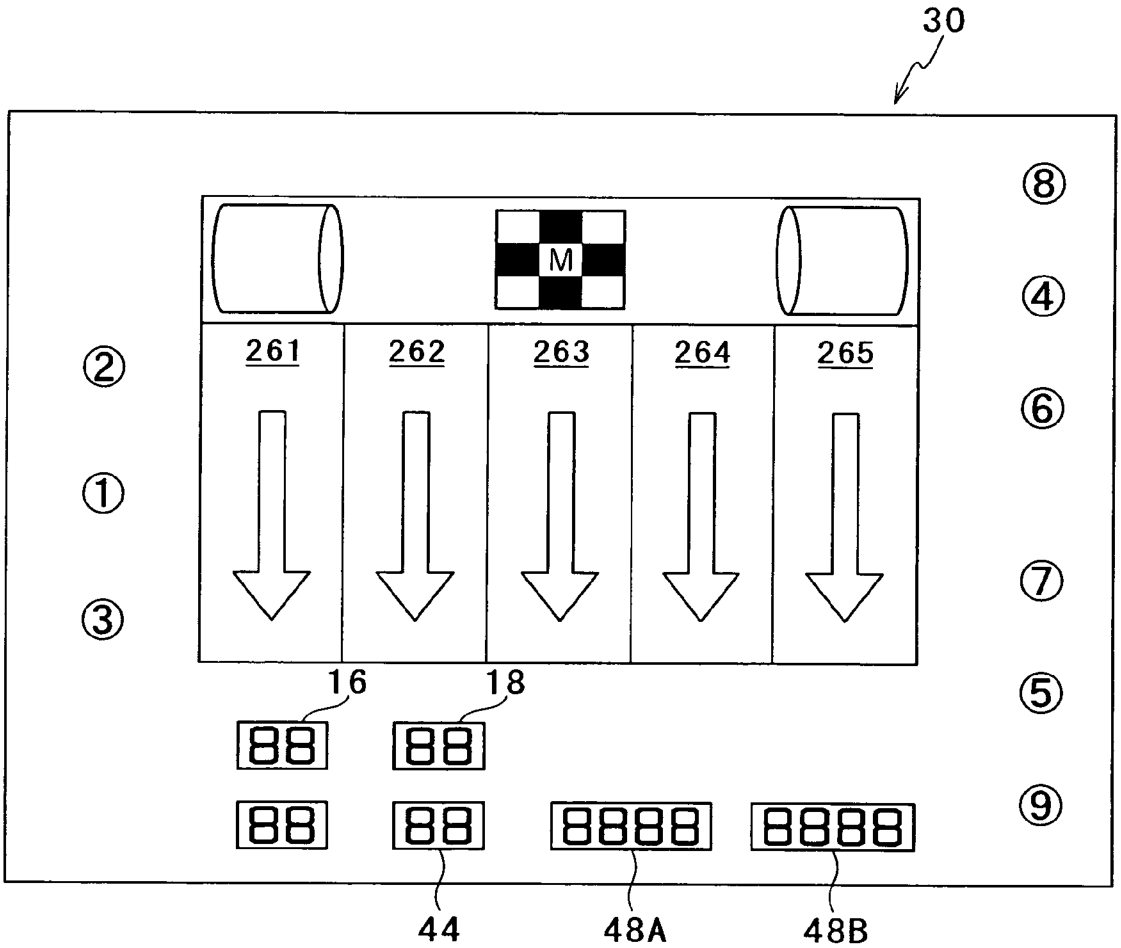
FIG. 6 is a diagram illustrating variably displayed symbols of the slot machine.

Variably displaying symbols will be described with reference to FIG. 6.

The five reels 261 to 265 can be scrolled vertically from the top to bottom. In accordance with the scrolling of the reels 261 to 265, symbols belonging to each of the reels 261 to 265 are variably displayed vertically from the top to bottom. Variably displaying the reel symbols is started in a predetermined form in response to pressing of the start switch 32 or spin repeat bet switch 24 as described above, and the reel symbols are displayed in a stopping state after a predetermined time has passed. The scrolling direction of the reels 261 to 265 is not limited to the vertical direction but the reels 261 to 265 may be scrolled in any direction. Alternatively, each symbol may be handled as one reel and may be spun or rotated horizontally or vertically so that each of fifteen symbols including vertical three symbols by horizontal five symbols can be variably displayed. Alternatively, the images of symbols may be displayed in a manner that they appear to be rendered on one panel, and the symbols are variably displayed sequentially every time the panel makes a half turn.

Figure 7:
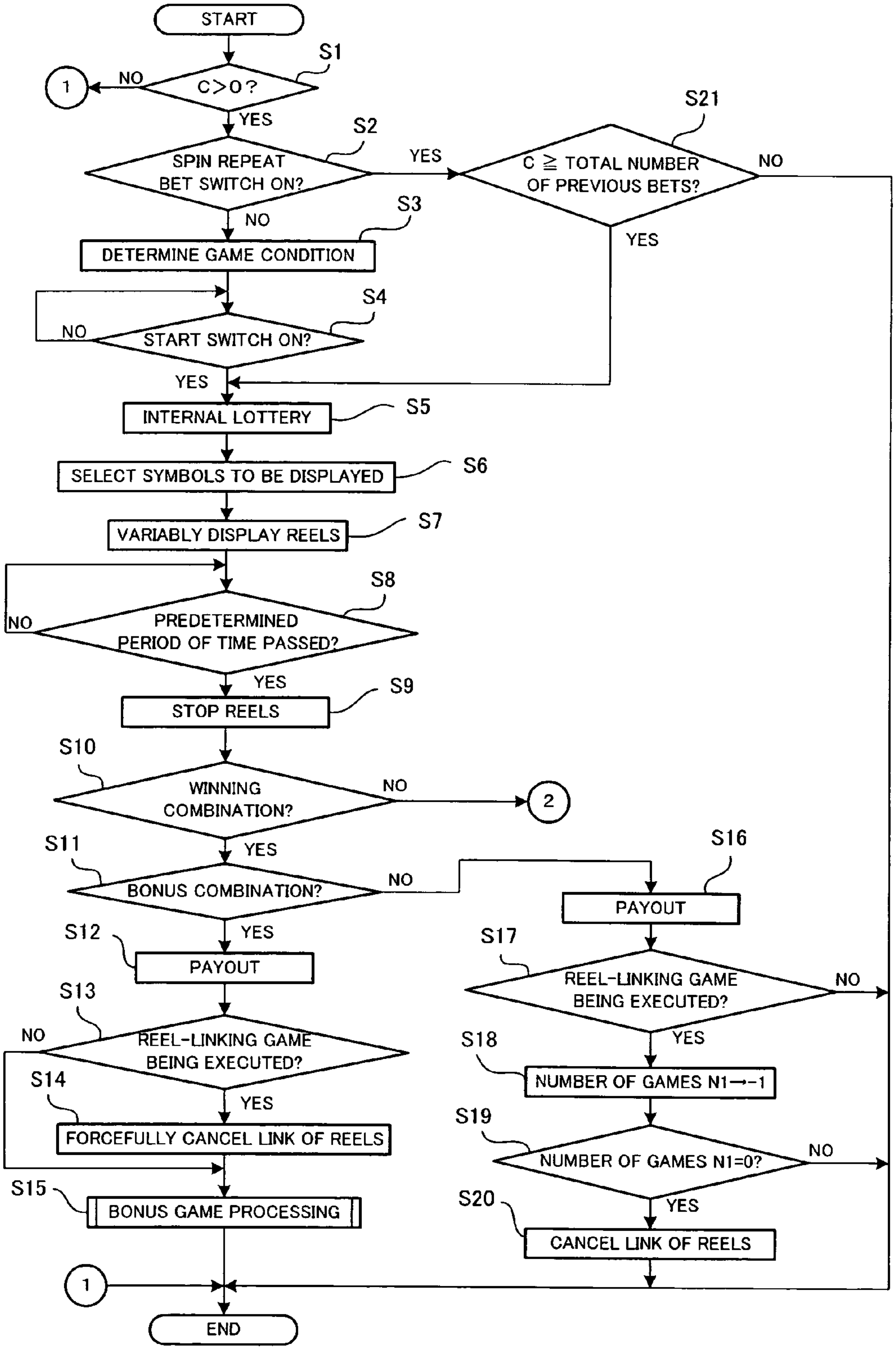
FIG. 7 is a flowchart showing a flow of a main processing to be performed in the slot machine.
Figure 8:
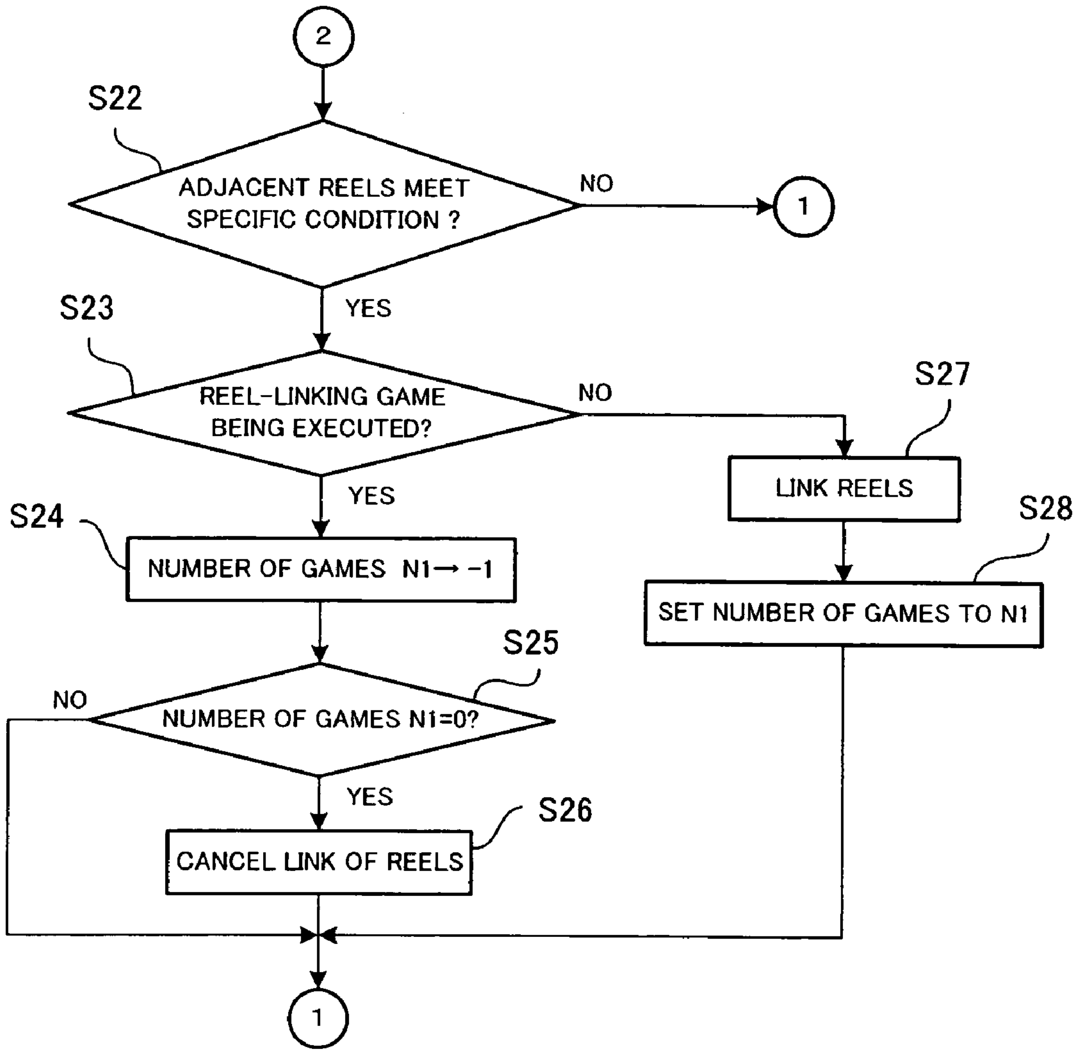
FIG. 8 is a flowchart subsequent to FIG. 7 showing a flow of the main processing to be performed in the slot machine.
Figure 9:
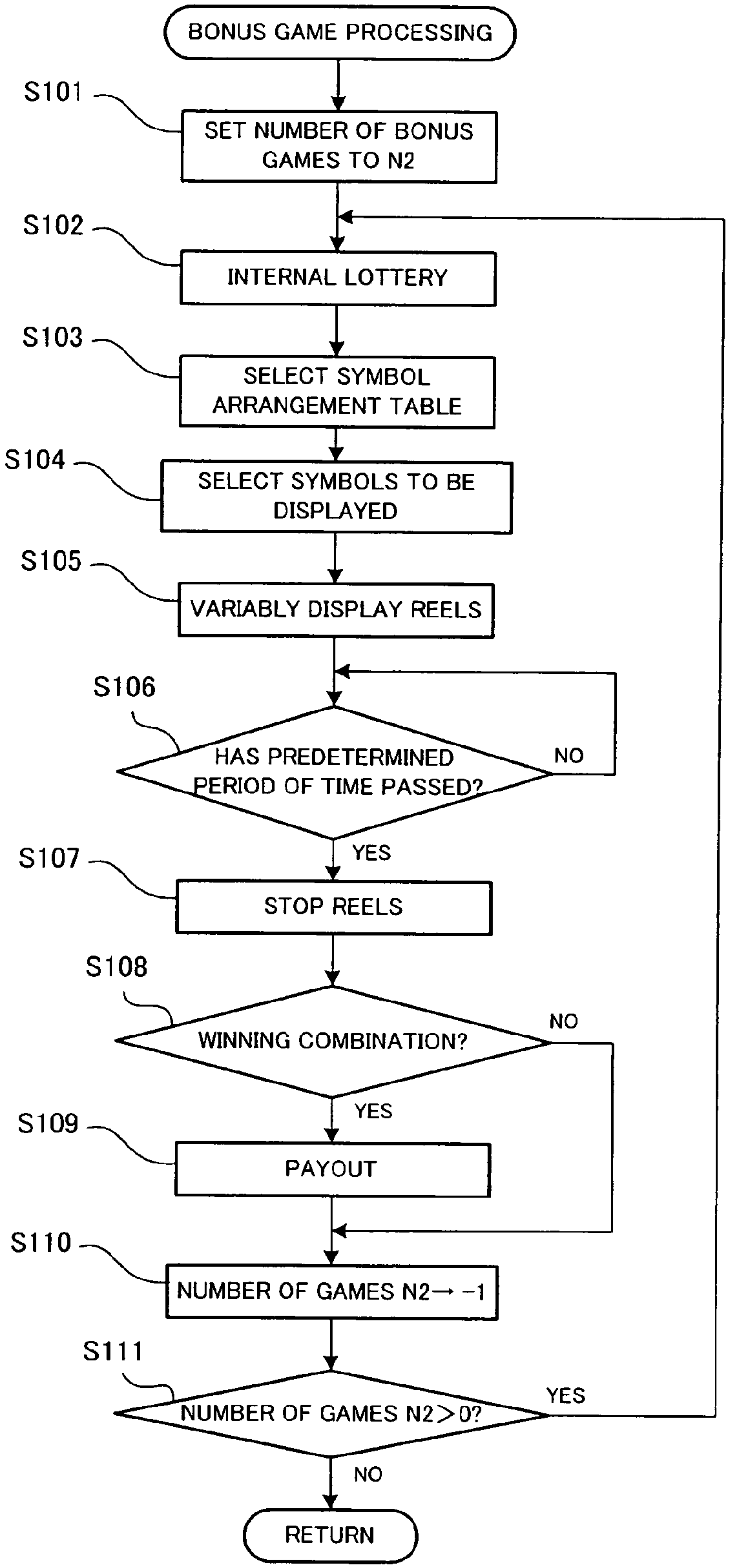
FIG. 9 is a flowchart showing a flow of a bonus game processing to be performed in the slot machine.

Next, a flow of a processing of the slot machine will be described. FIGS. 7 to 9 show routines for controlling the slot machine 10, which is executable by the control device 100. A series of routines shown in FIGS. 7 to 9 is invoked and executed in predetermined timing from the main program of the slot machine 10, which has been executed in advance.

In the following description, the slot machine 10 is activated in advance, and a variable used in the CPU 106 of the control device 100 is initialized to a predetermined value. Thus, the slot machine 10 is steadily operated.

A flow of a main processing of the slot machine 10 will be described with reference to FIG. 7.

In the main processing routine, the CPU 106 of the control device 100 first determines whether a credit serving as the remaining number of coins inserted by a player remains or not (step S1). More specifically, the CPU 106 loads a number of credits C stored in the RAM 110 and performs the determination based on the loaded number of credits C. If the number of credits C is "0", the CPU 106 cannot start a game and therefore exits from the routine without performing any processing. On the other hand, if the number of credits C is equal to or higher than "1", the CPU 106 determines that a credit or credits remain(s) and moves the processing to step S2.

In step S2, the CPU 106 determines whether the spin repeat bet switch 24 has been pressed or not (step S2). Here, when the spin repeat bet switch 24 is pressed and an operation signal is input from the switch 24 in accordance therewith, the CPU 106 advances the processing to step S21. On the other hand, when no operation signal is input from the spin repeat bet switch 24 even after a predetermined period of time has passed, the CPU 106 determines that the switch 24 has not been pressed and advances the processing to step S3.

In step S3, the CPU 106 determines a game condition. More specifically, based on an operation on the LINE switch 20 and/or BET switch 22, the CPU 106 determines the number of pay lines to be activated in the present game and the number of coins to be bet for the activated pay line or lines. Here, the CPU 106 receives operation signals output from the switches 22 and 20 in response to operations on the LINE switch 20 and BET switch 22 and stores the number of activated lines and the number of BETs in predetermined memory areas of the RAM 110 based on the number of times that the operation signals have been received. The CPU 106 loads the number of credits C stored in the RAM 110 and subtracts the total number of BETs obtained from the number of activated lines and number of BETs from the loaded number of credits C and stores the subtracted value in a predetermined memory area of the RAM 110. Furthermore, the CPU 106 loads the number of activated lines and number of BETs stored in the RAM 110 and inputs an image display command to the display control device 200 in order to display activated pay line, the number of activated pay lines, the number of BETs and the remaining number of credits on the display screen of the display device 30 based on the loaded number of activated lines and number of BETs. Thus, the CPU 206 of the display control device 200 performs the predetermined processing and displays an image relating to the game conditions on the display screen of the display device 30.

In the slot machine 10 having the five reels 261 to 265 and the nine pay lines L1 to L9, different game conditions including activated pay lines and the like is informed to a player so that, as described above, the player can clearly learn the game conditions determined by himself or herself before starting a game and the expectation for the game by the player can be possibly increased as a result.

Once game conditions are determined, the CPU 106 advances the processing to step S4. In the description, it is supposed that all of the pay lines L1 to L9 are activated in the processing in step S4 and subsequent steps.

In step S4, the CPU 106 waits for an operation on the start switch 32. Here, once the start switch 32 is pressed and an operation signal input from the start switch 32 in response thereto, the CPU 106 determines that the start switch 32 has been operated and advances the processing to step S5.

Besides, in step S21, the CPU 106 determines whether the value of the number of credits C is equal to or larger than the value of the total number of bets in the previous game or not. In other words, the CPU 106 determines whether the spin repeat bet switch 24 has been pressed or not. Here, once the spin repeat bet switch 24 is pressed and an operation signal is input from the switch 24 in response thereto, the CPU 106 loads the number of credits C and the number of activated lines and number of BETs in the previous game, which are stored in the RAM 110, and determines whether the value of the number of credits C is equal to or larger than the total number of bets in the previous game or not based on a relationship among three of the loaded number of credits C and numbers of activated lines and BETs. Here, when the CPU 106 determines that the value of the number of credits C is equal to or larger than the total number of bets in the previous game, the CPU 106 subtracts the value of the total number of bets in the previous game from the value of the number of credits C and stores the subtracted value in a predetermined memory area of the RAM 110. Furthermore, based on the loaded number of activated lines and BETs, the CPU 106 inputs an image display command to the display control device 200 in order to display activated pay lines, the number of the activated pay lines, the number of BETs and the remaining number of credits on the display screen of the display device 30. Thus, the CPU 206 of the display control device 200 performs the predetermined processing, whereby images relating to the game conditions are displayed on the display screen of the display device 30. After performing the process, the CPU 106 advances the processing to step S5. Thus, game conditions such as the number of pay lines activated in the previous game and the number of coins bet for the activated pay lines are applied to the present game. As a result, even when the LINE switch 20 and/or the BET switch 22 is/are not operated, a game is started. On the other hand, when it is determined that the value of the number of credits C is lower than the value of the number of total bets in the previous game, the CPU 106 cannot start a game and therefore exits from the routine without performing any processing.

In step S5, the CPU 106 performs internal lottery. Here, the CPU 106 inputs a command for generating random numbers to the random number generator 112 and extracts random numbers in a predetermined range generated by the random number generator 112. The CPU 106 stores the value of the extracted random numbers in a predetermined memory area of the RAM 110. While, in this embodiment, random numbers are generated by the random number generator 112 outside of the CPU 106, random numbers may be generated by the CPU 106 without the random number generator 112.

Once the internal lottery ends, the CPU 106 selects symbols to be displayed in a stopping state for each of the first reel 261 to fifth reels 265 (step S6). More specifically, the CPU 106 first loads the random numbers written in the RAM 110 in step S16, determines which range of a probability lottery table for a main game stored in the ROM 108 the loaded random numbers belongs to, and determines an internal winning combination in accordance with the range that the random numbers belongs to. The CPU 106 stores data of the determined internal winning combination in a predetermined memory area of the RAM 110. In the probability lottery table for a main game, random numbers for an internal win is predetermined for each kind of winning combination. The CPU 106 loads the random numbers and internal winning combination data stored in the predetermined memory areas of the RAM 110, selects one from the stop tables stored in the ROM 108 based on the loaded random numbers and internal winning combination data and stores the selected stop table in a predetermined memory area of the RAM 110. Then, the CPU 106 selects symbols to be displayed in a stopping state based on the selected stop table and with reference to a symbol arrangement table for a main game stored in the ROM 108. The CPU 106 stores information on the selected symbols in a predetermined memory area of the RAM 110.

Once symbols to be displayed in a stopping state are selected, the CPU 106 variably displays the reels 261 to 265 (step S7). In other words, the CPU 106 variably displays the first reel 261 to the fifth reel 265 sequentially or simultaneously. Here, the CPU 106 variably displays the reels 261 to 265 with reference to and based on the symbol arrangement table for a main game stored in the ROM 108.

Once variably displaying the reels 261 to 265 is started, the CPU 106 waits until a predetermined period of time has passed (step S8). Here, when the predetermined period of time has passed, the CPU 106 stops the reels 261 to 265 (step S9). More specifically, the CPU 106 stops the first reel 261 to the fifth reel 265 sequentially or simultaneously so that the symbols selected based on the stop table stored in a predetermined memory area of the RAM 110 in step S6 can be displayed.

Once the reels 261 to 265 are stopped, the CPU 106 determines whether a winning combination has been made or not (step S10). In other words, the CPU 106 determines whether a combination of symbols displayed on an activated line is a winning combination or not. More specifically, the CPU 106 determines whether, when the reels 261 to 265 are stopped in step S9, symbols aligned along a pay line activated in step S3 or step S21 are displayed in a predetermined winning form or not. Here, when the CPU 106 determines that no winning combination is made on the activated lines, the CPU 106 moves the processing to step S22 (see FIG. 8). On the other hand, when the CPU 106 determines that a winning combination of symbols is made on one of the activated lines, the CPU 106 moves the processing to step S11.

In step S11, the CPU 106 determines whether the made winning combination is a bonus combination or not. When trigger symbols triggering starting a bonus game are aligned along an activated line in a predetermined form, the CPU 106 determines that the winning form is a bonus combination and moves the processing to step S12. On the other hand, when the CPU 106 determines that the winning form is not a bonus combination but is a small win, the CPU 106 moves the processing to step S16.

In step S12, the CPU 106 pays out the number of coins corresponding to the bonus combination in a predetermined form. More specifically, the number of coins to pay out corresponding to the bonus combination is calculated based on a number-of-coins-to-payout table stored in a predetermined memory area of the ROM 108. Then, the CPU 106 loads the number of credits stored in a predetermined memory area of the RAM 110 and adds the calculated number of coins to pay out to the loaded number of credits and stores the sum value. The CPU 106 causes the credit counter 48 on the display screen of the display device 30 to indicate the stored value.

Once payout in accordance with the made bonus combination ends, the CPU 106 determines whether the reel-linking game is being executed or not (step S13). More specifically, the CPU 106 performs the determination processing based on whether an executing-reel-linking-game flag is ON or not. If the executing-reel-linking-game flag is ON, the CPU 106 determines that the reel-linking game is being executed and forcefully cancels the link of the reels adjacent to each other. More specifically, the CPU 106 outputs an image display command for forcefully canceling the link of reels to the display control device 200. Thus, the CPU 206 of the display control device 200 performs predetermined processing so that the link of the adjacent reels can be forcefully cancelled on the display screen of the display device 30. In response thereto, the executing-reel-linking-game flag is forcefully turned OFF. After that, the CPU 106 moves the processing to step S15. On the other hand, if the executing-reel-linking game flag is not ON, the CPU 106 determines that the reel-linking game is not being executed and moves the processing to step S15 without forcefully canceling the link. While, in this embodiment, the link of reels is forcefully cancelled in response to a bonus combination made, the invention is not limited thereto. Alternatively, the link of reels may be maintained during a bonus game after a bonus combination made.

In step S15, the CPU 106 performs bonus game processing. The bonus game can be performed without betting a coin during a predetermined number of games, for example, and 15 free games are defined to perform in this embodiment. In order to perform bonus game processing, the CPU 106 loads the number of credits C stored in a predetermined memory area of the RAM 110, adds the number of coins in accordance with a winning made by a scattered symbol, for example, to the loaded value and stores the sum value. Then, the CPU 106 causes the credit counter 48 to indicate the stored value on the display screen of the display device 30. Furthermore, the CPU 106 loads a high probability lottery table for a bonus game of the probability lottery tables stored in the ROM 108 and writes the loaded high probability lottery table over the probability lottery table for the main game stored in a predetermined memory area of the RAM 110. Furthermore, the CPU 106 stores data indicating a predetermined number of bonus games (15, in this embodiment) in a predetermined memory area of the RAM 110 (which corresponds to the processing for defining a number of bonus games N2 in step S101 described below). Thus, upon start of a bonus game, a player can expect that he/she can easily win during 15 games, which can enhance player's amusement of the games.

Once the bonus game processing ends, the CPU 106 exits from this routine.

Besides, in step S16, the CPU 106 pays out a number of coins in accordance with a small win in a predetermined form. More specifically, the CPU 106 calculates a number of coins to pay out corresponding to a small win based on a number-of-coins-to-payout table stored in a predetermined memory area of the ROM 108. Then, the CPU 106 loads the number of credits stored in a predetermined memory area of the RAM 110, adds the calculated number of coins to pay out to the loaded number of credits and stores the sum value. The CPU 106 causes the credit counter 48 of the display device 30 to indicate the stored value.

Once payout in response to a small win ends, the CPU 106 determines whether a reel-linking game is being executed or not (step S17). More specifically, the CPU 106 performs the determination processing based on whether the executing-reel-linking-game flag is ON or not. Here, if the executing-reel-linking-game flag is ON, the CPU 106 determines that the reel-linking game is being executed and decrements the number of reel-linking games N1 (step S18). More specifically, the CPU 106 loads the number of reel-linking games N1 stored in a predetermined memory area of the RAM 110 and subtracts "1" from the value of the loaded number of games N1. Then, the CPU 106 stores the subtracted value in the RAM 110. Then, the CPU 106 determines whether the number of reel-linking games N1 reaches a defined number of games or not (step S19) More specifically, the CPU 106 loads the number of reel-linking games N1 stored in a predetermined memory area of the RAM 110 and performs the determination processing based on whether the value of the loaded number of reel-linking games N1 is "0" or not. Here, if the number of reel-linking games N1 is "0", the CPU 106 determines that the number of reel-linking games N1 reaches the defined number of games and cancels the link of reels adjacent to each other (step S20). More specifically, the CPU 106 outputs an image display command for canceling the link of reels to the display control device 200. Thus, the CPU 206 of the display control device 200 performs predetermined processing so that the link of the adjacent reels can be cancelled on the display screen of the display device 30. In response thereto, the executing-reel-linking-game flag is turned OFF. Then, the CPU 106 exits from the routine. On the other hand, in step S19, if the number of reel-linking games N1 is "1" or more, the CPU 106 determines that the number of reel-linking games N1 has not reached the defined number of games yet and exits from the routine without canceling the link of reels. Besides, in step 17, if the executing-reel-linking game flag is not ON, the CPU 106 determines that the reel-linking game is not being executed and exits from the routine without performing the above described series of processings relating to the link of reels.

While, in the payout processing at steps S12 and S16, the number of coins to pay out is stored as credits, a payout command may be input to the hopper drive circuit 124 so that coins can be actually paid out from the payout opening 38 through the hopper 58.

Referring to FIG. 8, in step S22, the CPU 106 determines whether the magnet symbols MS serving as specific symbols belonging to two or more adjacent reels are displayed in a form that the N-poles and S-poles attract each other or not (see FIG. 10A for easy understanding). Here, when the magnet symbols MS belonging to adjacent reels are displayed in a form that the N poles and S-poles attract each other, the CPU 106 moves the processing to step S23. On the other hand, if the adjacent reels are not displayed on a specific condition, the CPU 106 exists from the routine without performing any processing.

In step S23, the CPU 106 determines whether a reel-linking game is being executed or not. More specifically, the CPU 106 performs the determination processing based on whether the executing-reel-linking game flag is ON or not. Here, if the executing-reel-linking-game flag is ON, the CPU 106 determines that a reel-linking game is being executed and moves the processing to step S24. On the other hand, if the executing-reel-linking-game flag is not ON, the CPU 106 determines that the reel-linking game is not being executed and moves the processing to step S27.

The processing from step S23 to step S26 is the same as that from step S17 to step S20.

Besides, in step S27, the CPU 106 links adjacent reels on the specific condition. More specifically, the CPU 106 outputs an image display command for linking the adjacent reels to the display control device 200. Thus, the CPU 206 of the display control device 200 performs predetermined processing so that the adjacent reels can be linked on the display screen of the display device 30. In response thereto, the executing-reel-linking-game flag is turned ON. After that, the CPU 106 defines the number of reel-linking games to N1 (step S28). In other words, the CPU 106 stores the defined number of reel-linking games N1 in a predetermined memory area of the RAM 110. Thus, as shown in FIG. 10B, when circle symbols CS serving as small-winning symbols belonging to the first reel 261 and second reel 262, which are adjacent to each other and linked by the magnet symbols MS, are aligned along an activated line, the display device 30 is controlled such that a li-zhi state for a small win can be maintained until the predetermined number N1 of games are finished thereafter. Accordingly, a small win is always made when the circle symbol CS belonging to the third reel 263 adjacent to the second reels 262 of the linked reels 261 and 262 is stopped on an activated line. Furthermore, as shown in FIG. 10C, when triangle symbols TS serving as the trigger symbols belonging to the second reel 262 and third reel 263, which are adjacent to each other and linked by the magnet symbols MS, are aligned along an activated line, the display device 30 is controlled such that a li-zhi state for making a bonus combination or starting a bonus game can be maintained until the predetermined number of games are finished thereafter. Accordingly, the bonus game is always started when the triangle symbol TS belonging to the fourth reel 264 adjacent to the third reel 263 linking to the second reel 262 is stopped on an activated line. After that, the CPU 106 exits from the routine.

Next, bonus game processing will be described with reference to FIG. 9. In the bonus game processing routine, the CPU 106 first defines a number of bonus games N2 as described above (step S101). Here, the CPU 106 loads a number of bonus games stored in a predetermined memory area of the RAM 110 and performs subsequent bonus game processing based on the value of the loaded number of bonus games N2.

In step S102, the CPU 106 performs an internal lottery. Here, the CPU 106 inputs a command for generating random numbers to the random number generator 112 and extracts random numbers in a predetermined range generated by the random number generator 112. The CPU 106 stores the value of the extracted random numbers in a predetermined memory area of the RAM 110.

Once the internal lottery ends, the CPU 106 selects a symbol arrangement table for a bonus game (step S103). Here, the CPU 106 selects one from the symbol arrangement tables stored in the ROM 108 based on the value of the random numbers, replaces the one for the main game by the selected symbol arrangement table and stores the selected one in the RAM 110. While, in this embodiment, one symbol arrangement table is selected for a bonus game by using random numbers as a parameter, the invention is not limited thereto but arbitrary selecting methods can be adopted here. A symbol arrangement table for a bonus game may not be selected but otherwise predetermined.

Once selecting a symbol arrangement table for a bonus game ends, the CPU 106 selects symbols to be displayed in a stopping state for each of the first reel 261 to the fifth reel 265 (step S104). More specifically, the CPU 106 first loads the random numbers written in the RAM 110 in step S102, determines which range of the probability lottery table for a bonus game stored in a predetermined memory area of the RAM 110 as described above the loaded random numbers belongs to and determines an internal winning combination in accordance with the range that the random numbers belongs to. The CPU 106 stores the determined internal winning combination in a predetermined memory area of the RAM 110. In the probability lottery table for a bonus game, random numbers for an internal win is predetermined for each kind of winning combination. The CPU 106 loads the random numbers and internal winning combination data stored in the predetermined memory areas of the RAM 110, selects one from the stop tables stored in the ROM 108 based on the loaded random numbers and internal winning combination data and stores the selected stop table in a predetermined memory area of the RAM 110. Then, the CPU 106 selects symbols to be displayed in a stopping state based on the selected stop table and with reference to the symbol arrangement table for a bonus game selected in step S103. The CPU 106 stores information on the selected symbols in a predetermined memory area of the RAM 110.

Once symbols to be displayed in a stopping state are selected, the CPU 106 variably displays the reels 261 to 265 (step S105). In other words, the CPU 106 variably displays the first reel 261 to fifth reel 265 sequentially or simultaneously. Here, the CPU 106 variably displays the reels 261 to 265 with reference to the symbol arrangement table for a bonus game selected in step S103 and stored in the RAM 110 and based on the symbol arrangement table.

Once variably displaying the reels 261 to 265 is started, the CPU 106 waits until a predetermined period of time has passed (step S106). Here, when the predetermined period of time has passed, the CPU 106 stops the reels 261 to 265 (step S107) More specifically, the CPU 106 stops the first reel 261 to fifth reel 265 sequentially or simultaneously so that the symbols selected based on the stop table in step S104 can be displayed.

Once the reels 261 to 265 are stopped, the CPU 106 determines whether a winning combination is made or not (step S108). In other words, the CPU 106 determines whether a combination of symbols displayed on an activated line is a winning combination or not. More specifically, the CPU 106 determines whether, when the reels 261 to 265 are stopped in step S107, symbols aligned along an activated line are displayed in a predetermined winning form or not. Here, when the CPU 106 determines that a winning combination of symbols is made on one of the activated lines, the CPU 106 pays out a number of coins in accordance with the winning combination in a predetermined form (step S109). More specifically, the CPU 106 pays out the number of coins based on the winning combination determined in step S108. Here, the CPU 106 calculates the number of coins to pay out based on the number-of-coins-to-payout table stored in a predetermined memory area of the ROM 108. Then, the CPU 106 loads the number of credits stored in a predetermined memory area of the RAM 110, adds the calculated number of coins to pay out to the loaded number of credits and stores the sum value. The CPU 106 causes the credit counter 48 on the display screen of the display device 30 to display the stored value. Then, the CPU 106 moves the processing to step S110 and pays out coins. On the other hand, if the CPU 106 determines that no winning combination is made on the activated lines, the CPU 106 moves the processing to step S110 without the payout.

In step S110, the CPU 106 decrements the number of bonus games N2. More specifically, the CPU 106 loads the number of bonus games N2 stored in a predetermined memory area of the RAM 110 and subtracts "1" from the loaded number of games N2. The CPU 106 stores the subtracted value in the RAM 110. Then, the CPU 106 moves the processing to step S111 and determines whether the number of bonus games N2 remains or not again in the same manner as that of the step S101. If the number of bonus games N2 remains, the CPU 106 returns to the internal lottery processing in step S102. On the other hand, if the CPU 106 determines that the number of bonus games N2 does not remain (that is, N2 is equal to and lower than zero "0"), the CPU 106 exists from the routine.

Apparently, details of various conventional and publicly known free games are applicable to the details of a free game provided as a bonus.

As described above, according to this embodiment, as shown in FIG. 10A, in the main game, when stopping all of the reels 261 to 265 results in the magnet symbols MS serving as specific symbols belonging to two or more adjacent reels being in a form that the N-poles and S-poles attract each other, the adjacent reels are linked to each other. After that, the display device 30 is controlled such that the reels 261 to 265 can be variably displayed and stopped with the link between the adjacent reels kept until a predetermined number of games are finished. Here, as shown in FIG. 10B, when circle symbols CS serving as small-winning symbols belonging to the first reel 261 and second reel 262, which are adjacent to each other and linked by the magnet symbols MS, for example, are aligned along an activated line, the display device 30 is controlled such that a li-zhi state for a small win can be maintained thereafter until the predetermined number of games are finished. Accordingly, when the circle symbol CS belonging to the third reel 263 adjacent to the second reel 262 of the linked reels 261 and 262 is stopped at an activated position for making a small win, the small win is achieved. On the other hand, as shown in FIG. 10C, when triangle symbols TS serving as the trigger symbols belonging to the second reel 262 and third reel 263, which are adjacent to each other and linked by the magnet symbols MS, for example, are aligned on an activated line, the display device 30 is controlled such that a li-zhi state for making a bonus combination or starting a bonus game can be maintained thereafter until the predetermined number of games are finished. Accordingly, when the triangle symbol TS belonging to the fourth reel 264 adjacent to the third reel 263 linking to the second reel 262 is stopped at an activated position for making a bonus combination, the bonus game is started. Thus, a game characteristic can be given which is not provided by a free game provided as a bonus for a main game. Therefore, players including beginners can easily understand a rule of a game. As a result, beginners can be given an incentive to challenge the game.

Furthermore, since details of image processing for variably displaying and stopping reel symbols for giving the new game characteristic include details on variably displaying and stopping the reels 261 to 265 with the adjacent reels linked to each other, the image processing is not complicated significantly.

Furthermore, since the processing keeping the link of adjacent reels is performed when the magnet symbols MS serving as specific symbols belonging to adjacent reels are stopped in a form that the N-poles and S-poles attract each other, players including beginners can immediately perceive that the reel-linking game is developed thereafter and can Immediately understand rules fitting to new game details. As a result, the smooth and fast advancement of the game can be obtained.

The invention is not limited to the embodiment.

While, according to the embodiment, the number of reel-linking games is predetermined, the number of games may vary by determining the number of reel-linking games by lottery. In this case, the player's interest in the machine can be more raised.

Figure 11A:
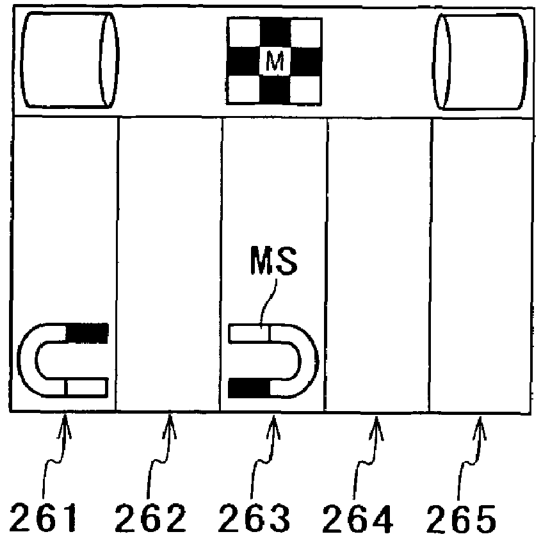
FIGS. 11A and 11B are diagrams each showing a linking form of reels of a slot machine according to another embodiment of the invention.
Figure 11B:
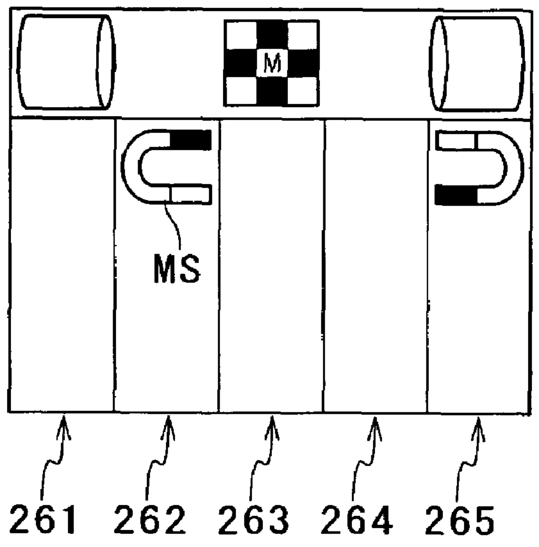

According to the embodiment, when the magnet symbols MS serving as specific symbols belonging to two or more adjacent reels are stopped in a form that the N-poles and S-poles attract each other, the adjacent reels are linked to each other, for example. However, as shown in FIGS. 11A and 11B, when the magnet symbols MS serving as specific symbols belonging to left and right reels sandwiching one or more reels are stopped in a form that the N-poles and S-poles attract each other, three or more reels including the left and right reels and the one or more reels sandwiched between the magnet symbols MS may be linked to each other. Also in this case, the object of the invention can be achieved sufficiently. For example, assuming that the one or more reels sandwiched between the magnet symbols MS is/are (a) substance(s) transparent to magnetic flux lines, such as paper, a state that magnet symbols MS belonging to the left and right reels sandwiching the one or more reels are linked in a form that the N-poles and S-poles attract each other can be expressed. Thus, players including beginners can immediately perceive that the reel-linking game is to be performed thereafter and can immediately understand rules fitting to new game details. Therefore, the smooth and fast advancement of the game can be securely obtained. Apparently, in a case that the reels spin laterally (that is, spin in the horizontal direction), when specific symbols belonging to the top and bottom reels sandwiching one or more reels are stopped on a specific condition, three or more reels including the top and bottom reels and the one or more reels sandwiched between the specific symbols may be linked to each other. While, in this embodiment, the activated lines L1, L2 and L3 are all defined horizontally, for example, as shown in FIG. 5, the invention is not limited thereto. For example, the invention is apparently applicable to one having activated lines defined diagonally.

While, according to the embodiment, the invention is applied to a simulated reel slot machine, for example, the object of the invention can be sufficiently achieved even when the invention is applied to a mechanical reel slot machine. This is because simultaneously rotating two or more mechanical reels in a form that adjacent mechanical reels seem to be linked may not be difficult very much since a general mechanical reel slot machine adopts a minutely rotation-controllable drive unit including a stepping motor or a pulse motor as a source for driving each mechanical reel.

While, according to the embodiment, the invention is applied to a 5-reel type slot machine, for example, the object of the invention can be sufficiently achieved even when the invention is applied to a 3-reel type slot machine. This means that the invention is not particularly limited by the number of reels.

Furthermore, the invention is also applicable to gaming machines other than slot machines.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A gaming machine comprising:

a symbol display unit for variably displaying and stopping a plurality of symbols for each columns;

a profit giving unit for, when stopping symbols belonging to all columns by the symbol display unit results in a winning combination of symbols, giving a profit in accordance with the winning combination to a player;

a column linking unit for linking at least two of the columns to form an equivalent of one column; and a symbol display control unit for controlling the symbol display unit such that the symbols can be variably displayed and stopped while keeping the at least two columns linked by the column linking unit to form the equivalent of one column.

2. A gaming machine according to claim 1, wherein:

the symbol display control unit controls the symbol display unit such that the symbols can be variably displayed and stopped with the link kept after the columns are linked by the column linking unit until a predetermined number of games are finished, and the column linking unit links columns adjacent to each other to form the equivalent of one column when stopping symbols belonging to all columns by the symbol display unit results in a specific kind of symbols belonging to the columns adjacent to each other being in a specific state, or links columns on both sides of one or more columns and columns therebetween to form the equivalent of one column when stopping symbols belonging to all columns by the symbol display unit results in a specific kind of symbol belonging to each of the columns on both sides of the one or more columns being in a specific state.

3. A gaming machine according to claim 1, wherein the column linking unit links columns adjacent to each other to form the equivalent of one column when stopping symbols belonging to all columns by the symbol display unit results in a specific kind of symbols belonging to the columns adjacent to each other being in a specific state, or links columns on both sides of one or more columns and columns therebetween to form the equivalent of one column when stopping symbols belonging to all columns by the symbol display unit results in a specific kind of symbol belonging to each of the columns on both sides of the one or more columns being in a specific state.

4. A computer program embodied on a physical recordable medium for controlling a gaming machine having a symbol display unit for variably displaying and stopping a plurality of symbols for each columns, in which, when stopping symbols belonging to all columns by the symbol display unit results in a winning combination of symbols, a profit in accordance with the winning combination is given to a player, causing the gaming machine to perform the steps of:

linking columns adjacent to each other to form the equivalent of one column when stopping symbols belonging to all columns by the symbol display unit results in a specific kind of symbol belonging to the adjacent columns being in a specific state, or linking columns on both sides of one or more columns and the one or more columns therebetween when stopping symbols belonging to all columns by the symbol display unit results in a specific kind of symbol belonging to each of the columns on both sides of the one or more columns being in a specific state; and controlling the symbol display unit such that the symbols can be variably displayed and stopped with the link kept after the columns are linked by the column linking step.

5. A gaming machine comprising:

a symbol display unit for variably displaying and stopping a plurality of symbols for each column;

a profit giving unit for, when stopping symbols belonging to all columns by the symbol display unit results in a winning combination of symbols, giving a profit in accordance with the winning combination to a player;

a column linking unit for, when the symbols belonging to all the columns are stopped by the symbol display unit in a first stage, linking at least two of the columns in a link to form an equivalent of one column; and a symbol display control unit for, when the symbols belonging to all the columns are variably displayed and stopped by the symbol display unit in a second stage, controlling the symbol display unit such that the symbols can be variably displayed and stopped while keeping the at least two columns linked by the column linking unit to form the equivalent of one column.

6. A gaming machine according to claim 5, wherein the column linking unit links columns adjacent to each other to form the equivalent of one column when stopping symbols belonging to all columns by the symbol display unit results in a specific kind of symbol belonging to adjacent columns being in a specific state, or links columns on both sides of one or more columns and columns therebetween to form the equivalent of one column when stopping symbols belonging to all columns by the symbol display unit results in a specific kind of symbol belonging to each of the columns on both sides of the one or more columns being in a specific state.

7. A gaming machine according to claim 5, wherein:

the symbol display control unit controls the symbol display unit such that the symbols can be variably displayed and stopped while keeping the link after the columns are linked by the column linking unit until a predetermined number of games are finished, and the column linking unit links columns adjacent to each other to form the equivalent of one column when stopping symbols belonging to all columns by the symbol display unit results in a specific kind of symbol belonging to the columns adjacent to each other being in a specific state, or links columns on both sides of one or more columns and columns therebetween to form the equivalent of one column when stopping symbols belonging to all columns by the symbol display unit results in a specific kind of symbol belonging to each of the columns on both sides of the one or more columns being in a specific state.

8. A gaming machine comprising:

a symbol display unit for variably displaying and stopping a plurality of symbols for each column;

a profit giving unit for, when stopping symbols belonging to all columns by the symbol display unit results in a winning combination of symbols, giving a profit in accordance with the winning combination to a player;

a column linking unit linking at least two of the columns to form an equivalent of one column in a link; and a symbol display control unit for controlling such that a first state, where one kind of symbol belonging to each of the linked columns is aligned along an activated line, can be achieved, and the plurality of symbols can thereafter be variably displayed and stopped during the first state while keeping the at least two columns linked by the column linking unit to form the equivalent of one column, the first state indicating a state where a winning combination relating to the one kind of symbol is made when the one kind of symbol belonging to a column adjacent to one of the linked columns is stopped at an activated position for winning.

9. A gaming machine according to claim 8, wherein the column linking unit links columns adjacent to each other to form the equivalent of one column when stopping symbols belonging to all columns by the symbol display unit results in a specific kind of symbol belonging to the columns adjacent to each other being in a specific state, or links columns on both sides of one or more columns and columns therebetween to form the equivalent of one column when stopping symbols belonging to all columns by the symbol display unit results in a specific kind of symbol belonging to each of the columns on both sides of the one or more columns being in a specific state.

10. A gaming machine according to claim 8, wherein:

the symbol display control unit controls the symbol display unit such that the symbols can be variably displayed and stopped while keeping the link after the columns are linked by the column linking unit until a predetermined number of games are finished, and the column linking unit links columns adjacent to each other to form the equivalent of one column when stopping symbols belonging to all columns by the symbol display unit results in a specific kind of symbol belonging to the columns adjacent to each other being in a specific state, or links columns on both sides of one or more columns and columns therebetween to form the equivalent of one column when stopping symbols belonging to all columns by the symbol display unit results in a specific kind of symbol belonging to each of the columns on both sides of the one or more columns being in a specific state.

11. A gaming machine comprising:

a symbol display unit for variably displaying and stopping a plurality of symbols for each column;

a profit giving unit for, when stopping symbols belonging to all columns by the symbol display unit results in a winning combination of symbols, giving a profit in accordance with the winning combination to a player;

a column linking unit for, when the symbols belonging to all the columns are stopped by the symbol display unit in a first stage, linking at least two of the columns to form an equivalent of one column in a link; and a symbol display control unit for, when the symbols belonging to all the columns are variably displayed and stopped by the symbol display unit in a second stage, controlling such that a first state where one kind of symbol belonging to each of the linked columns are aligned along an activated line can be achieved and thereafter the symbols can be variably displayed and stopped with the first state kept, while keeping the at least two columns linked by the column linking unit to form the equivalent of one column, the first state indicating a state where a winning combination relating to the one kind of symbol will be made if the one kind of symbol belonging to a column adjacent to one of the linked columns is stopped at an activated position for making the winning combination.

12. A gaming machine according to claim 11, wherein the column linking unit links columns adjacent to each other to form the equivalent of one column when stopping symbols belonging to all columns by the symbol display unit results in a specific kind of symbol belonging to the columns adjacent to each other being in a specific state, or links columns on both sides of one or more columns and columns therebetween to form the equivalent of one column when stopping symbols belonging to all columns by the symbol display unit results in a specific kind of symbol belonging to each of the columns on both sides of the one or more columns being in a specific state.

13. A gaming machine according to claim 11, wherein:

the symbol display control unit controls the symbol display unit such that the symbols can be variably displayed and stopped with the link kept after the columns are linked by the column linking unit until a predetermined number of games are finished, and the column linking unit links columns adjacent to each other to form the equivalent of one column when stopping symbols belonging to all columns by the symbol display unit results in a specific kind of symbols belonging to the columns adjacent to each other being in a specific state, or links columns on both sides of one or more columns and columns therebetween to form the equivalent of one column when stopping symbols belonging to all columns y the symbol display unit results in a specific kind of symbol belonging to each of the columns on both sides of the one or more columns being in a specific state.

14. A method for controlling a gaming machine having a symbol display unit for variably displaying and stopping a plurality of symbols for each column, in which, when stopping symbols belonging to all columns by the symbol display unit results in a winning combination of symbols, a profit in accordance with the winning combination is given to a player, comprising the steps of:

linking a plurality of the columns to form an equivalent of one column and controlling the symbol display unit such that the symbols can be variably displayed and stopped while keeping the at least two columns linked in the column linking step to form the equivalent of one column.

15. A method for controlling a gaming machine according to claim 14, wherein the column linking step inks columns adjacent to each other to form the equivalent of one column when stopping symbols belonging to all columns by the symbol display unit results in a specific kind of symbol belonging to the columns adjacent to each other being in a specific state, or links columns on both sides of one or more columns and columns therebetween to form the equivalent of one column when stopping symbols belonging to all columns by the symbol display unit results in a specific kind of symbol belonging to each of the columns on both sides of the one or more columns being in a specific state.

* * * * *